United States Patent
Stowe et al.

(10) Patent No.: US 9,630,424 B2
(45) Date of Patent: Apr. 25, 2017

(54) VCSEL-BASED VARIABLE IMAGE OPTICAL LINE GENERATOR

(71) Applicant: Palo Alto Research Center Incorporated, Palo Alto, CA (US)

(72) Inventors: Timothy David Stowe, Alameda, CA (US); David K. Biegelsen, Portola Valley, CA (US); Patrick Y. Maeda, San Jose, CA (US); Christopher L. Chua, San Jose, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 0 days.

(21) Appl. No.: 14/681,957

(22) Filed: Apr. 8, 2015

(65) Prior Publication Data

US 2015/0273863 A1    Oct. 1, 2015

Related U.S. Application Data

(63) Continuation-in-part of application No. 13/216,877, filed on Aug. 24, 2011, now Pat. No. 9,030,515.

(51) Int. Cl.
*B41J 2/45* (2006.01)
*B41J 2/455* (2006.01)
(Continued)

(52) U.S. Cl.
CPC ............... *B41J 2/451* (2013.01); *B41J 2/44* (2013.01); *B41J 2/455* (2013.01); *B41J 2/465* (2013.01);
(Continued)

(58) Field of Classification Search
CPC .... B41J 2/451; B41J 2/455; B41J 2/47; G02B 27/64; G02B 13/18; G02B 13/22
See application file for complete search history.

(56) References Cited

U.S. PATENT DOCUMENTS 3,800,699 A    4/1974  Carley
5,041,851 A    8/1991  Nelson
(Continued)

FOREIGN PATENT DOCUMENTS

EP    0957384 A2    11/1999
EP    1155865 A2    11/2001
(Continued)

*Primary Examiner* — Kristal Feggins
*Assistant Examiner* — Kendrick Liu
(74) *Attorney, Agent, or Firm* — Bever, Hoffman & Harms, LLP

(57) ABSTRACT

A single-pass imaging system utilizes a two-dimensional (2D) light field generator (e.g., one or more VCSEL devices) to generate a modulated two-dimensional modulated light field in accordance with image data for a single row of pixels, and an anamorphic optical system that concentrates the two-dimensional modulated light field in a process direction such that a one-dimensional scan line image extending in a cross-process direction is generated on an imaging surface. The VCSEL array is configured using a scan line image data group made up of pixel image data portions, with associated groups of light emitting elements aligned in the process direction being configured by each pixel image data portion. Gray scaling is achieved either by turning on some of the light emitting elements of the associated group, or by turning the light emitting elements of the associated group partially on, e.g. using a common drive current.

8 Claims, 15 Drawing Sheets

(51) Int. Cl.
*G02B 26/08* (2006.01)
*G02B 27/20* (2006.01)
*G02B 13/22* (2006.01)
*B41J 2/47* (2006.01)
*B41J 2/465* (2006.01)
*B41J 2/44* (2006.01)

(52) U.S. Cl.
CPC ............ *B41J 2/47* (2013.01); *G02B 13/22* (2013.01); *G02B 26/0833* (2013.01); *G02B 27/20* (2013.01)

(56) References Cited

U.S. PATENT DOCUMENTS

| | | | |
|---|---|---|---|
| 5,101,236 A | 3/1992 | Nelson et al. | |
| 5,105,207 A | 4/1992 | Nelson | |
| 5,105,369 A | 4/1992 | Nelson | |
| 5,151,718 A | 9/1992 | Nelson | |
| 5,500,670 A | 3/1996 | Ang et al. | |
| 5,563,398 A | 10/1996 | Sampsell | |
| 5,719,682 A | 2/1998 | Venkateswar | |
| 5,721,622 A | 2/1998 | Venkateswar | |
| 5,737,096 A | 4/1998 | Takeuchi et al. | |
| 5,754,217 A | 5/1998 | Allen | |
| 5,953,152 A | 9/1999 | Hewlett | |
| 5,954,424 A | 9/1999 | Anderson et al. | |
| 5,997,150 A | 12/1999 | Anderson | |
| 6,121,984 A | 9/2000 | Anderson | |
| 6,529,261 B2 | 3/2003 | Shinada | |
| 6,552,777 B2 | 4/2003 | Sunagawa | |
| 6,567,217 B1 | 5/2003 | Kowarz et al. | |
| 6,606,739 B2 | 8/2003 | Kanatake et al. | |
| 6,724,546 B2 | 4/2004 | Nishimae et al. | |
| 7,048,388 B2 | 5/2006 | Takaura et al. | |
| 7,154,640 B2 | 12/2006 | Ishihara | |
| 7,218,380 B2 | 5/2007 | De Jager | |
| 7,508,570 B1 | 3/2009 | Meisburger | |
| 8,031,390 B2 | 10/2011 | Grasser et al. | |
| 8,104,901 B2 | 1/2012 | Kwon | |
| 8,199,178 B1 | 6/2012 | Payne | |
| 8,282,221 B2 | 10/2012 | Arai et al. | |
| 8,405,913 B2 | 3/2013 | Maeda | |
| 8,472,104 B2 | 6/2013 | Stowe et al. | |
| 8,520,045 B2 | 8/2013 | Maeda | |
| 9,030,515 B2 * | 5/2015 | Stowe | B41J 2/465 347/239 |
| 2002/0044265 A1 | 4/2002 | Sumi | |
| 2002/0140801 A1 * | 10/2002 | kubota | B41J 2/465 347/239 |
| 2002/0171878 A1 | 11/2002 | Nakajima | |
| 2004/0190573 A1 | 9/2004 | Kruschwitz et al. | |
| 2006/0237404 A1 | 10/2006 | Ishikkawa et al. | |
| 2008/0055391 A1 | 3/2008 | Sakamoto et al. | |
| 2008/0062390 A1 | 3/2008 | Zhang et al. | |
| 2010/0165426 A1 * | 7/2010 | Kihara | G03H 1/265 359/3 |
| 2010/0208329 A1 | 8/2010 | Sandstrom et al. | |
| 2012/0281293 A1 * | 11/2012 | Gronenborn | B23K 26/0608 359/619 |
| 2013/0016520 A1 | 1/2013 | Reimer et al. | |
| 2013/0050669 A1 | 2/2013 | Maeda | |
| 2014/0064305 A1 | 3/2014 | Sipes, Jr. | |

FOREIGN PATENT DOCUMENTS

EP 1327527 A1 7/2003
WO 2006/083004 A2 8/2006

* cited by examiner

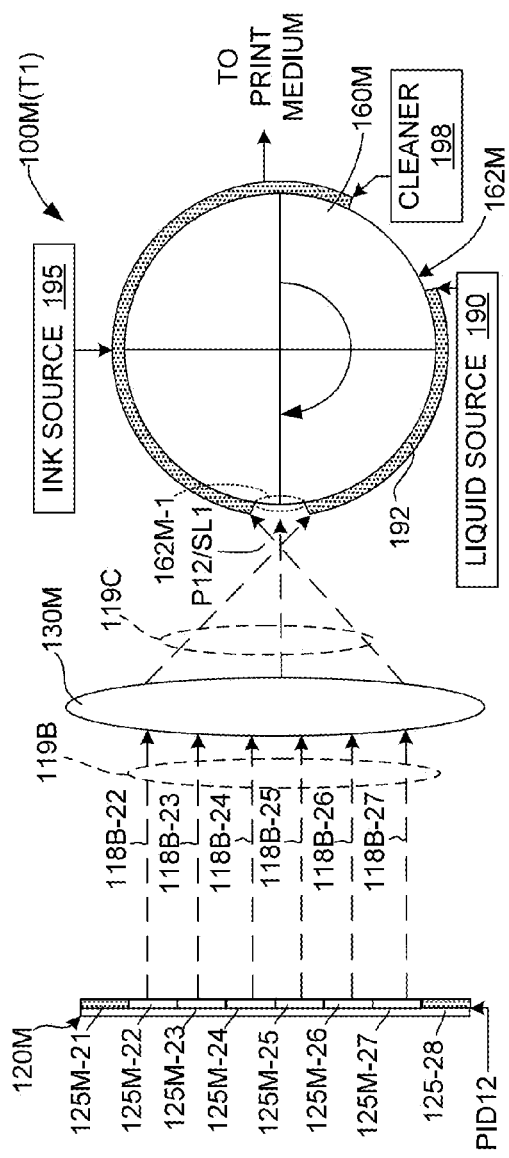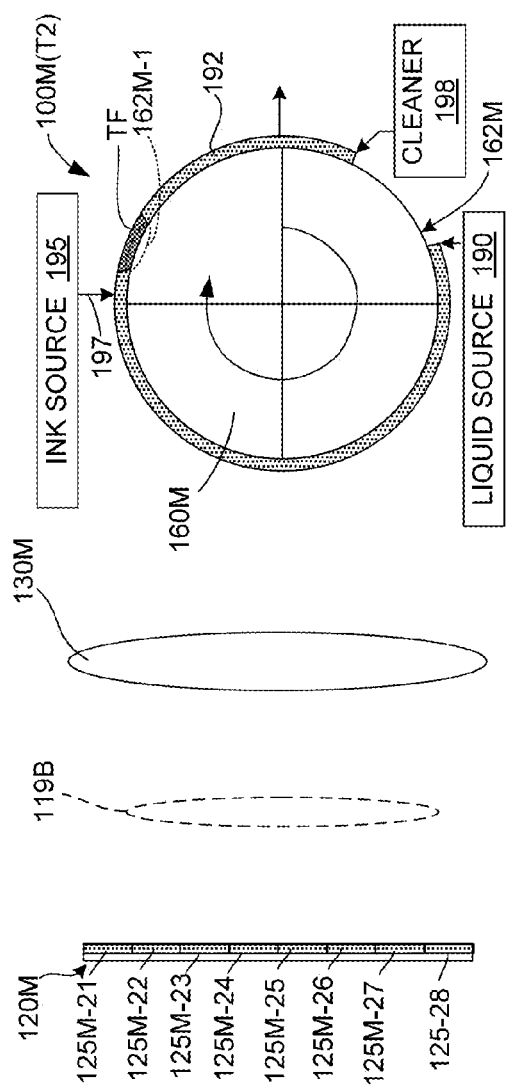
FIG. 10(A)
FIG. 10(B)

VCSEL-BASED VARIABLE IMAGE OPTICAL LINE GENERATOR

RELATED APPLICATIONS

This application is a continuation-in-part (CIP) of U.S. Patent application for "SINGLE-PASS IMAGING METHOD USING SPATIAL LIGHT MODULATOR AND ANAMORPHIC PROJECTION OPTICS", U.S. application Ser. No. 13/216,877, filed Aug. 24, 2011.

FIELD OF THE INVENTION

This invention relates to imaging systems, and in particular to single-pass imaging systems that utilize high energy light sources for high speed image generation.

BACKGROUND OF THE INVENTION

Laser imaging systems are extensively used to generate images in applications such as xerographic printing, mask and maskless lithographic patterning, laser texturing of surfaces, and laser cutting machines. Laser printers often use a raster optical scanner (ROS) that sweeps a laser perpendicular to a process direction by utilizing a polygon or galvo scanner, whereas for cutting applications laser imaging systems use flatbed x-y vector scanning.

One of the limitations of the laser ROS approach is that there are design tradeoffs between image resolution and the lateral extent of the scan line. These tradeoffs arising from optical performance limitations at the extremes of the scan line such as image field curvature. In practice, it is extremely difficult to achieve 1200 dpi resolution across a 20" imaging swath with single galvanometers or polygon scanners. Furthermore, a single laser head motorized x-y flatbed architecture, ideal for large area coverage, is too slow for most high speed printing processes.

For this reason, monolithic light emitting diode (LED) arrays of up to 20" in width have an imaging advantage for large width xerography. Unfortunately, present LED arrays are only capable of offering 10 milliWatt power levels per pixel and are therefore only useful for some non-thermal imaging applications such as xerography. In addition, LED bars have differential aging and performance spread. If a single LED fails it requires the entire LED bar be replaced. Many other imaging or marking applications require much higher power. For example, laser texturing, or cutting applications can require power levels in the 10 W-100 W range. Thus LED bars cannot be used for these high power applications. Also, it is difficult to extend LEDs to higher speeds or resolutions above 1200 dpi without using two or more rows of staggered heads.

Higher power semiconductor laser arrays in the range of 100 mW-100 Watts do exist. Most often they exist in a 1D array format such as on a laser diode bar often about 1 cm in total width. Another type of high power directed light source are 2D surface emitting VCSEL arrays. However, neither of these high power laser technologies allow for the laser pitch between nearest neighbors to be compatible with 600 dpi or higher imaging resolution. In addition, neither of these technologies allow for the individual high speed control of each laser. Thus high power applications such as high power overhead projection imaging systems, often use a high power source such as a laser in combination with a spatial light modulator such as a DLP™ chip from Texas Instruments or liquid crystal arrays.

The DLP-based approach, although appealing in many respects, has several disadvantages. First, the high power laser has to be fully on, even for low color saturation images that require only a small fraction of the laser energy to form. Most of the laser energy is diverted into a beam dump and wasted, leading to poor energy efficiency and reduced laser lifetime. Second, micromirrors absorb part of the laser energy, and can only handle a limited amount of optical power before they deform and fail. This limitation limits the print speed and long term reliability of the imaging system. Third, micro-mirrors are mechanical components that need to be carefully aligned to the rest of the optical system. Such mechanical switching components add complexity and cost.

What is needed is laser based imaging approach with high total optical power well above the level of 1 Watt that is scalable across large process widths in excess of 20" as well as having achievable resolution greater than 1200 dpi and allows high resolution high speed imaging in a single pass.

SUMMARY OF THE INVENTION

The present invention is directed to single-pass imaging system that utilizes a two-dimensional light field generator (e.g., one or more vertical-cavity surface-emitting laser (VCSEL) devices) to generate a two-dimensional modulated light field according to predetermined scan line image data, and an anamorphic demagnifying optical system that focuses the modulated light field to a form a narrow scan line image. Here the term anamorphic optical system refers to any system of optical lens, mirrors, or other elements that project the light from an object plane, such as a pattern of light formed by a VCSEL device, to a final imaging plane with a differing amount of magnification along orthogonal directions. Thus, for example, a square-shaped imaging pattern formed by a 2D array of VCSEL laser elements could be anamorphically projected so as to magnify its width and at same time de-magnify (or bring to a concentrated focus) its height thereby transforming square shape into an image of an extremely thin elongated rectangular shape at the final image plane. By utilizing the anamorphic optical system to concentrate the modulated light, high total optical intensity (flux density) (i.e., on the order of hundreds of Watts/cm$^2$) can be generated on any point of the scan line image without requiring a high intensity light source, thereby facilitating a reliable yet high power imaging system that can be used, for example, for single-pass high resolution high speed printing applications, or in industrial applications requiring a high-energy laser line. Furthermore, it should be clarified that the light field generator may include multiple optical elements, such as light pipes or microlens arrays, that reshape the light from one or more non-uniform sources of light so as to provide, when dictated by predetermined scan line image data, substantially uniform light intensity across at least one dimension of a two-dimensional light field.

According to an aspect of the present invention, the light field generator includes multiple light emitting elements (e.g., light emitting diodes) that are disposed on a substrate in a two-dimensional array, and a controller for individually controlling the light emitting elements in accordance with the predetermined scan line image data such that a light generating structure (e.g., a laser diode) of each emitting element is adjustable between a first modulated state (e.g., fully-on) during which light having a relatively high intensity is generated, and one or more second modulated states during which light having a relatively low intensity is generated (e.g., either a low intensity generated by a partially-on element, or zero intensity when the element is fully-off). When one of the light emitting elements is either in the first modulated state or a partially-on second modulated state, the light emitting element directs its associated modulated light portion in a corresponding predetermined direction (e.g., the elements transmit their associated light portions along parallel lines toward the anamorphic optical system). By generating modulated light in this manner prior to being anamorphically projected and concentrated, the present invention is able to produce a high power scan line along the entire imaging region simultaneously, as compared with a rastering system that only applies high power to one point of the scan line at any given instant. This approach also avoids the need for mechanical steering required in DLP-based approachs. In addition, because the imaging system utilizes relatively low power modulated light portions emitted from a number of light emitting elements, the present invention can be produced using low-cost, commercially available laser array devices, such as commercially available VCSEL devices. Moreover, by concentrating different numbers of light emitting elements at each pixel location, the imaging system is capable of generating a lower intensity scan line (i.e., by concentrating a relatively small number of modulated light portions) to produce, for example, high-speed printing systems, or generating higher intensity scan lines (i.e., by concentrating a relatively large number of modulated light portions) to produce laser cutting systems that can be useful in a wide range of industrial applications.

According to another aspect of the present invention, the arrayed light emitting elements of the light field generator are arranged in rows and columns, and the anamorphic optical system is arranged to concentrate light portions received from each column onto an associated imaging region ("pixel") of the elongated scan line image. That is, all of the light emitting elements in each column forms an associated pixel group, and the concentrated modulated light portions received from each pixel group are directed by the anamorphic optical system onto the same corresponding imaging region of the scan line image so that the resulting imaging "pixel" is the composite light from all light emitting elements in the given column that are in an "on" state (i.e., either fully-on or partially-on). A key aspect of the present invention lies in understanding that the light portions emitted by each light emitting element represent only a portion of one pixel of binary data that is delivered to the scan line by the anamorphic optical system, so that the brightness of each imaging "pixel" making up the scan line image is controlled by the number of elements in the associated column that are in the "on" state. Accordingly, by individually controlling the multiple emitting elements disposed in each column, and by concentrating the light passed by each column onto a corresponding imaging region, the present invention provides an imaging system having gray-scale capabilities by way of controlling the number and/or degree (i.e., fully or partially) of the "on" modulated state of elements in each column.

According to alternative embodiments of the present invention, the two-dimensional light field generator is implemented using one or more vertical-cavity surface-emitting laser (VCSEL) devices including multiple light generating/emitting elements (VCSEL laser elements) that are disposed in an array and collectively produce the desired light energy. In alternative embodiments, the VCSEL devices are either single mode or multi-mode devices. The light emitting elements of multi-mode VCSEL devices have larger aperture sizes than those of single mode devices, and can produce higher maximum light output power. However, single mode devices have better beam quality. For digital offset printing applications of the present invention, the preferred embodiment is multi-mode devices.

According to alternative embodiments, the VCSEL laser (light emitting) elements are either addressed independently or using common drive currents generated by the controller. Addressing the light emitting elements independently involves generating and transmitting a separate control signal for each light emitting element, which facilitates beam shaping but requires a large number of control lines and associated expense. In a presently preferred embodiment, the VCSEL devices are fabricated such that the controller generates and transmits multiple drive currents, each drive current associated with a pixel image data value, where each drive current is supplied to all light emitting elements in a given column. The use of shared (common) drive currents for each column saves much expense and complexity, and gray scale control can still be achieved by controlling the amount of current transmitted to a given column in an analog manner. In alternative embodiments, either parallel wiring or series wiring is utilized to transmit the shared currents to all light emitting elements in each column. Generating the series wiring arrangement requires more process steps than parallel wiring, but allows a higher voltage, lower current drive source to be used.

According to other alternative embodiments, improved optical throughput and collimation are achieved by disposing microlenses over each light emitting element of the VCSEL array. In alternative specific embodiments, the microlenses are either disposed in an array on a substrate that is mounted in a hybrid fashion onto a VCSEL device (i.e., after the VCSEL elements are fabricated), or microlenses are monolithically integrated and formed (i.e., integrally disposed) over each VCSEL element as part of the VCSEL array fabrication process. In either case, each microlens is disposed such that light generated by an associated VCSEL (light emitting) element passes through and is collimated by the associated microlens.

According to yet another embodiment of the present invention, the light emitting elements in each column of the VCSEL (light field generator) are aligned at a small diagonal angle relative to the cross-process and process orthogonal directions of the anamorphic optical system (i.e., relative to the scan line image), whereby the anamorphic optical system focuses each modulated light portion onto an associated sub-imaging region of the scan line image. A benefit of this parallelogram configuration (tilted orientation) is that the imaging system produces a higher sub-pixel spatial addressable spacing and provides an opportunity to utilize software to position image "pixels" with fractional precision in both the X-axis and Y-axis directions. The light emitting elements of the VCSEL (light field generator) are optionally set at a tilt angle that produces an alignment of each imaging region with multiple elements disposed in different columns of the array, thereby facilitating variable resolution and variable intensity. This arrangement also facilitates software adjustment seamlessly stitching between adjacent imaging sub-units.

According to other alternative embodiments, improved beam divergence characteristics in the line and cross-line directions is achieved using different VCSEL element shapes, such as round or rectangular shapes. Coupled with the anamorphic cylindrical optics one can optimize the light collection into pixels without loss of resolution.

According to another embodiment of the present invention, the overall anamorphic optical system includes a cross-process optical subsystem and a process-direction optical subsystem that concentrate the modulated light portions received from the light field generator such that the concentrated modulated light forms the substantially one-dimensional scan line image, wherein the concentrated modulated light at the scan line image has a higher optical intensity (i.e., a higher flux density) than that of the homogenized light. By anamorphically concentrating (focusing) the two-dimensional modulated light pattern to form a high energy elongated scan line, the imaging system of the present invention outputs a higher intensity scan line. The scan line is usually directed towards and swept over a moving imagine surface near its focus. This allows an imaging system to be formed such as a printer. The direction of the surface sweep is usually perpendicular to the direction of the scan line and is customarily called the process direction. In addition, the direction parallel to the scan line is customarily called the cross-process direction. The scan line image formed may have different pairs of cylindrical or acylindrical lens that address the converging and tight focusing of the scan line image along the process direction and the projection and magnification of the scan line image along the cross-process direction. In one specific embodiment, the cross-process optical subsystem includes first and second cylindrical or acylindrical lenses arranged to project and magnify the modulated light onto the elongated scan line in a cross-process direction, and the process-direction optical subsystem includes a third cylindrical or acylindrical focusing lens arranged to concentrate and demagnify the modulated light on the scan line in a direction parallel to a process direction. This arrangement facilitates generating a wide scan line that can be combined ("stitched" or blended together with a region of overlap) with adjacent optical systems to produce an assembly having a substantially unlimited length scan line. In one embodiment, aligned microlenses disposed on the light field generator are utilized to provide improved optical throughput. Alternatively, an optional collimating field lens may also be disposed between the light field generator and cylindrical or acylindrical focusing lens in both the process and cross-process direction. It should be understood that the overall optical system may have several more elements to help compensate for optical aberrations or distortions and that such optical elements may be transmissive lenses or reflective mirror lenses with multiple folding of the beam path. According to another embodiment of the present invention, various imaging systems and associated apparatus/systems include a two-dimensional light field generator including multiple VCSEL devices disposed in an array. In an exemplary embodiment, a scanning/printing apparatus includes a single-pass imaging system having a two-dimensional light field generator including a single row of VCSEL devices and an associated elongated anamorphic optical system arranged to generate an elongated scan line, and a scan structure (e.g., an imaging drum cylinder) that is disposed to receive the concentrated modulated light from the anamorphic optical system. By utilizing a sufficient number of VCSEL devices in the row, the imaging system is made scalable across large process widths in excess of 20". According to a specific embodiment, the imaging surface may be one that holds a damping (fountain) solution such as is used for variable data lithographic printing. In another exemplary embodiment, two or more VCSEL devices are aligned in the process direction (i.e., such that each column, or associated pixel group, includes an aligned set of light emitting elements that are disposed on two or more VCSEL devices). This arrangement facilitates generating very high energy laser lines (i.e., with total optical power well above the level of 1 Watt) that may be useful in a wide range of industrial applications.

BRIEF DESCRIPTION OF THE DRAWINGS

These and other features, aspects and advantages of the present invention will become better understood with regard to the following description, appended claims, and accompanying drawings, where:

FIGS. 10(A), 10(B), 10(C) and 10(D) are simplified side views showing the imaging system of FIG. 9 during an imaging operation.

DETAILED DESCRIPTION OF THE DRAWINGS

The present invention relates to improvements in imaging systems and related apparatus (e.g., scanners and printers). The following description is presented to enable one of ordinary skill in the art to make and use the invention as provided in the context of a particular application and its requirements. As used herein, directional terms such as "upper", "uppermost", "lower", "vertical" and "horizontal" are intended to provide relative positions for purposes of description, and are not intended to designate an absolute frame of reference. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
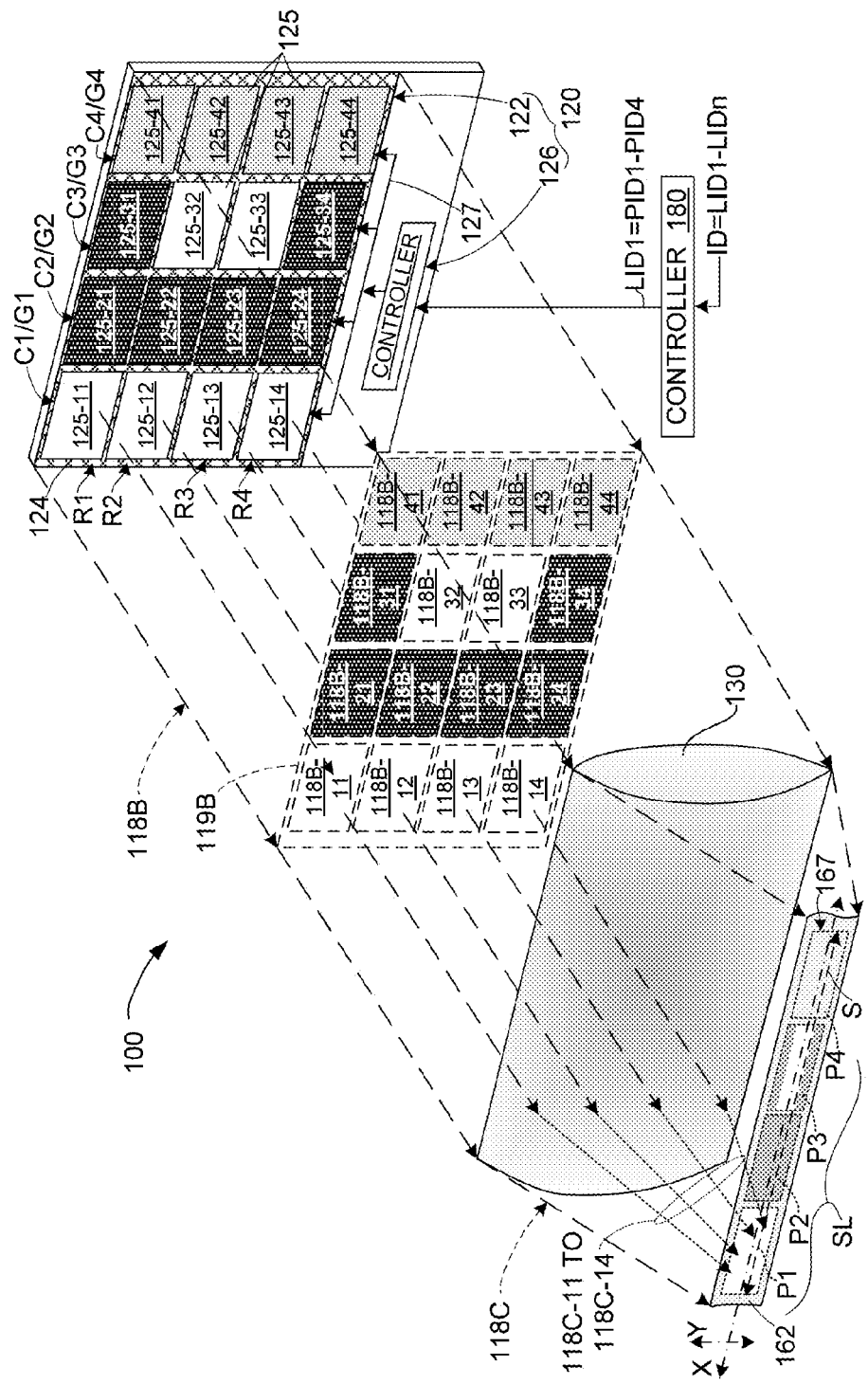
FIG. 1 is a top side perspective view showing a simplified imaging system utilized in accordance with an exemplary embodiment of the present invention.

FIG. 1 is a perspective view showing a simplified single-pass imaging system 100 utilized to generate a substantially one-dimensional scan line image SL on a two-dimensional image on an imaging surface 162 in accordance with a simplified embodiment of the present invention. Simplified imaging system 100 generally includes a two-dimensional light field generator 120 that receives image data ID from a system controller 180 and enerates a two-dimensional modulated light field 119B according to predetermined scan line image data ID, and an anamorphic optical system 130 that images and concentrates modulated light 118B as described below to generate a scan line image SL on imaging surface 162.

The imaging process described herein involves processing digital image data corresponding to an arbitrary two-dimensional image that is stored according to known techniques and referred to herein as image data file ID. Image data file ID is depicted at the bottom of FIG. 1 being transmitted to controller 180, which processes image data file ID in the manner described below, and transmits image data file ID one line at a time to light field generator 120. That is, consistent with most standardized image file formats, image data file ID is made up of multiple scan line image data groups LID1 to LIDn, where each scan line image data group includes multiple pixel image data portions that collectively form an associated one-dimensional scan line image of the two-dimensional image. For example, in the simplified example shown in FIG. 1, scan line image data group LID1 includes four pixel image data portions PID1 to PID3. Each pixel image data portion (e.g., pixel image data portion PID1) includes one or more bits of image data corresponding to the color and/or gray-scale properties of the corresponding pixel image associated with the corresponding portion of the two-dimensional image. Those skilled in the art will recognize that, in practical embodiments, each scan line image data group typically includes a much larger number of pixel image data portions that the four-, eight-, or twenty-four pixel image rows described herein.

Referring to the FIG. 1, two-dimensional light field generator 120 includes an array 122 of light emitting elements 125 that are controlled by a device controller 126, in accordance with received image data ID (e.g., line image data group LID1) to generate associated modulated light portions 118B that collectively form a two-dimensional modulated light field 119B. In the exemplary embodiment, array 122 includes light emitting elements 125-11 to 125-44 disposed in a rectangular pattern that respectively emit light portions 118B-11 to 118B-44 that form modulated light field 119B such that modulated light field 119B is projected through anamorphic optical system 130 onto an elongated imaging region 167 of imaging surface 162. In a practical embodiment, two-dimensional light field generator 120 includes an array 122 made up of a large number of VCSEL (laser diode) elements. For purposes of illustration, only a small subset of light emitting elements is depicted in FIG. 1 and in the various figures described herein.

According to various alternative practical embodiment, two-dimensional light field generator 120 is implemented using one or more vertical-cavity surface-emitting laser (VCSEL) devices including multiple light generating/emitting elements (VCSEL laser elements). In alternative embodiments, the VCSEL devices are either single mode or multi-mode devices. The light emitting elements of multi-mode VCSEL devices have larger aperture sizes than those of single mode devices, and can produce higher maximum light output power. However, single mode devices have better beam quality. For digital offset printing applications of the present invention, the preferred embodiment is multi-mode devices. In other alternative embodiments, the VCSEL devices are either top-emitting or bottom-emitting devices. Bottom-emitting arrangements are usually flip-chip mounted onto heat sinks, so they have better thermal conductivity and can accommodate higher power operation than top-emitting devices. However, light has to pass through the substrate, so the light emission wavelength cannot be shorter than the absorption band edge of the substrate material. For GaAs substrates, the wavelength is limited to longer than 870 nm. Although the substrate can be removed after flip-chip bonding, such processes add cost and complexity. Top-emitting structures are simpler to fabricate and package, but they have poorer thermal properties. The presently preferred embodiment for digital offset printing applications is a VCSEL device having a bottom-emitting flip-chipped architecture and operating at a wavelength of 980 nm.

Referring to the upper right region of FIG. 1, modulating elements 125-11 to 125-44 are disposed in four horizontal rows R1 to R4 and four vertical columns C1-C4 on a semiconductor substrate (chip) 124. Modulating elements 125-11 to 125-44 are positioned to direct their associated modulated light portions along predetermined parallel paths toward anamorphic optical system 130. Each light emitting element 125-11 to 125-44 is adjustable, by way of control signals 127 generated by device controller 126, between two or more modulated states, where each elements modulated state is defined by the amount of light generated by that element. For example, when array 122 is controlled in accordance with line image data group LID1 as depicted in FIG. 1, light emitting element 125-11 is adjusted into a "fully on" (first) modulated state, whereby light emitting element 125-11 generates and transmits associated modulated light portion 118B-11 having a maximum/highest (first) intensity. Alternatively, when a given light emitting element is in a "partially on" or "off" (second) modulated state, the given light emitting element transmits (or does not transmit) an associated light portion having a lower (or zero) intensity. For example, light emitting element 125-21 is depicted as being in an "off" state, whereby associated modulated light portion 118B-21 is black (i.e., contains no light). Alternatively, light emitting element 125-41 is depicted as being in a "partially on" state, whereby associated modulated light portion 118B-41 has an intensity higher than that of modulated light portion 118B-21, but lower than that of modulated light portion 118B-11. Accordingly, during the time period in which array 122 is controlled by line image data group LID1, elements 125-11 to 125-44 generate modulated two-dimensional light field 119B as depicted in FIG. 1, whereby the pattern of light and dark regions of light field 119B is determined by the relative positions of light emitting elements adjusted into the first modulated state (e.g., elements 125-11 to 125-14, 125-32 and 125-33) relative to light emitting elements adjusted into the second modulated state (e.g., elements 125-21 to 125-24, 125-31 and 125-34, which are off, and elements 125-41 to 125-44 which are partially on). During a subsequent imaging phase (not shown), a second scan line image data portion is written into control circuit 126 (i.e., scan line image data portion LIN1 is overwritten), and a corresponding second scan line image (not shown) is generated in another elongated imaging region of imaging surface 162. Note that this process requires movement (translation) of imaging surface 162 in the process (Y-axis) direction after scan line image SL is generated and before the second scan line image is generated. Those skilled in the art will recognize that, by repeating such imaging phases for each scan image data portion LIN1-LINn of image data file ID, the associated two-dimensional image is generated on imaging surface 162.

Referring to the lower left portion of FIG. 1, anamorphic optical system 130 serves to anamorphically image and concentrate (focus) two-dimensional modulated light field 119B onto elongated imaging region 167 of imaging surface 162. In particular, anamorphic optical system 130 includes one or more optical elements (e.g., lenses or mirrors) that are positioned to receive the two-dimensional pattern of modulated light field 119B, where the one or more optical elements (e.g., lenses or mirrors) are arranged to concentrate the received light portions to a greater degree along the process (e.g., Y-axis) direction than along the cross-process (X-axis) direction, whereby the received light portions are anamorphically focused to form elongated scan line image SL that extends parallel to the cross-process/scan (X-axis) direction. Note that modulated light portions that have passed through anamorphic optical system 130 but have not yet reached imaging surface 162 are referred to as concentrated modulated light portions (e.g., modulated light portion 118B-11 becomes concentrated modulated light portion 118C-11 between anamorphic optical system 130 and imaging surface 162). Anamorphic system 130 is represented for the purposes of simplification in FIG. 1 by a single generalized anamorphic projection lens. In practice anamorphic system 130 is typically composed of multiple separate cylindrical or acylindrical lenses such as described below with reference to FIGS. 6(A) and 6(B), but is not limited to the generalized lens or specific lens systems described herein.

According to another aspect of the present invention, anamorphic optical system 130 is arranged to concentrate light portions received from each column of light emitting elements 125-11 to 125-44 (i.e., those either in a fully-on or partially-on modulated state) onto an associated imaging region (imaging pixel) P1 to P4 of elongated scan line image SL. As indicated in FIG. 1, all four light emitting elements 125-11 to 125-14 in column C1 form an associated pixel group G1, and the associated modulated light portions 118B-11 to 118B-14 generated by light emitting elements 125-11 to 125-14 are concentrated and directed by anamorphic optical system 130 as light portions 118C-11 to 118C-14 onto corresponding imaging region P1, whereby the resulting imaging pixel generated in imaging region P1 is the composite modulated light received from all light emitting elements i.e., 125-11 to 125-14 in column C1, which in this example are in the fully-on state. Similarly, light emitting elements 125-21 to 125-24 in column C2 form an associated pixel group G2, light emitting elements 125-31 to 125-34 in column C3 form an associated pixel group G3, and light emitting elements 125-41 to 125-44 in column C4 form an associated pixel group G4.

A key aspect of the present invention lies in understanding that the light portions emitted by each light emitting element represent only a portion of one pixel of binary data that is delivered to the scan line by the anamorphic optical system, so that the brightness of each imaging "pixel" making up the scan line image is controlled by the number of elements in the associated column that are in the "on" state. Accordingly, by individually controlling the multiple emitting elements disposed in each column, and by concentrating the light passed by each column onto a corresponding imaging region, the present invention provides an imaging system having gray-scale capabilities by way of controlling the number and/or degree (i.e., fully or partially) of the "on" modulated state of elements in each column. As mentioned above, imaging pixel P1 has a maximum brightness because all elements 125-11 to 125-14 in column C1 (group G1) are fully-on. Conversely, because all elements 125-21 to 125-24 are fully-off in the depicted example, the associated modulated light portions generate a resulting imaging pixel in imaging region P2 that having a minimum brightness (maximum darkness). Gray scaling is achieved by the elements of column C3 (group G3) by way of adjusting elements 125-31 and 125-34 into the fully off modulated state, and adjusting elements 125-32 and 125-33 into the fully on state, whereby the resulting imaging pixel in imaging region P3 is generated only by light portions 118B-32 and 118B-33, and thus has a medium brightness. An alternative method for achieving gray scaling is depicted by the elements of column C4 (group G4), where all of elements 125-41 and 125-44 are adjusted into a partially-on modulated state, whereby the resulting imaging pixel in imaging region P4 is generated by semi-bright light portions 118B-41 to 118B-44, and thus has a medium brightness.

Figure 2:
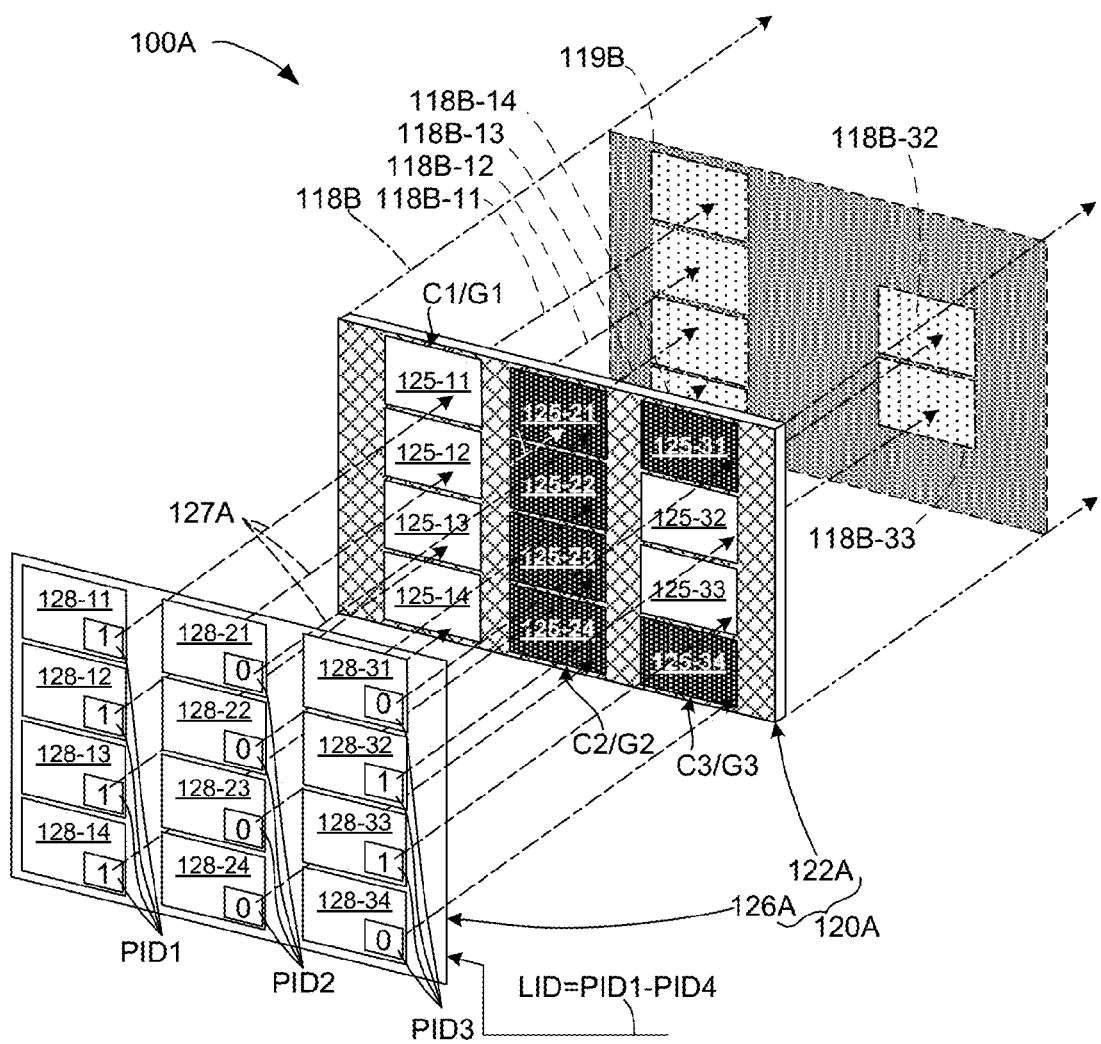
FIG. 2 is a top side perspective view showing a partial imaging system utilizing individually addressed VSCEL laser diodes according to a specific embodiment of the present invention.
Figure 3A:
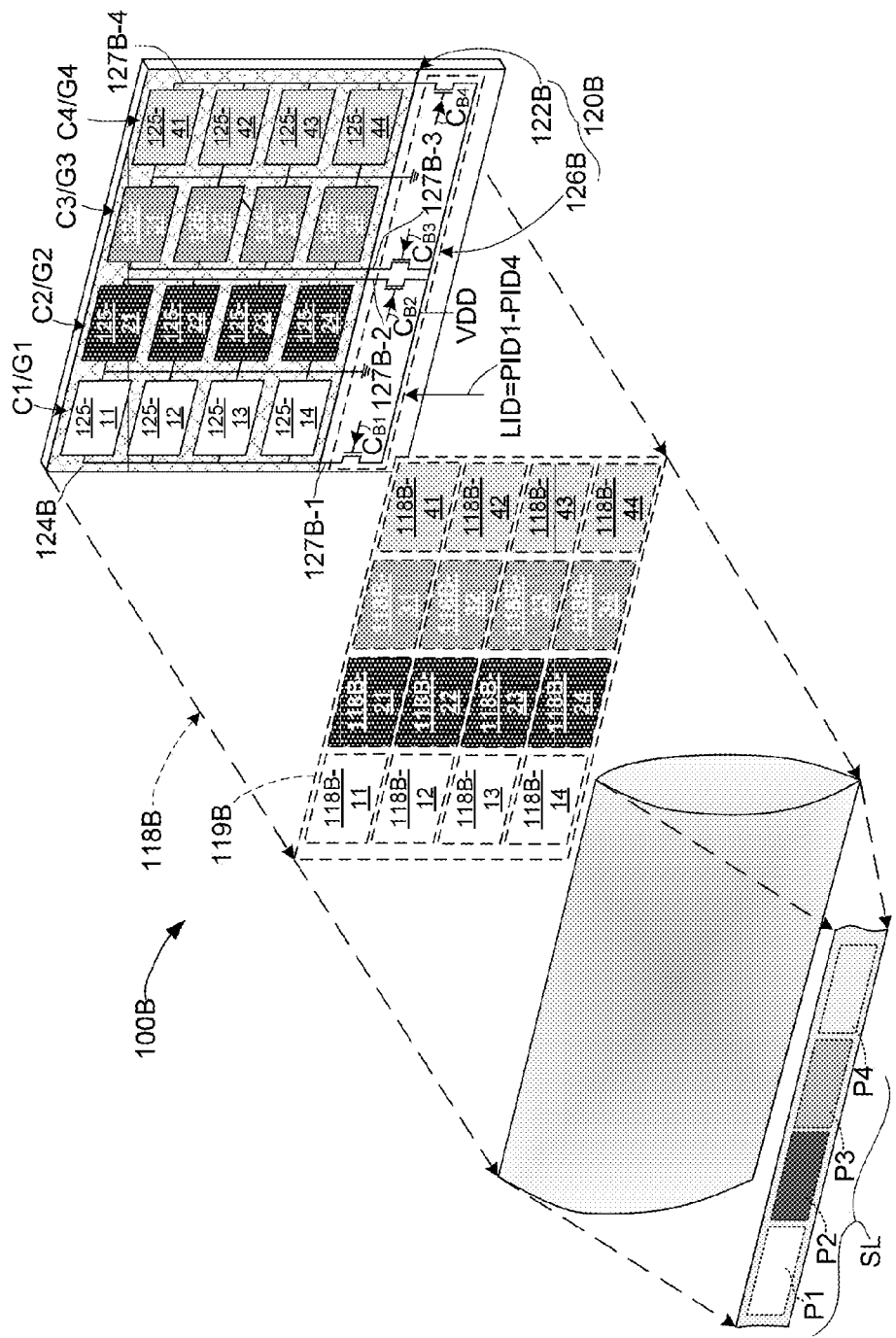
FIGS. 3(A) and 3(B) are simplified perspective views showing partial imaging systems utilizing VSCEL laser diodes controlled by shared driving currents according to alternative embodiments of the present invention.
Figure 3B:
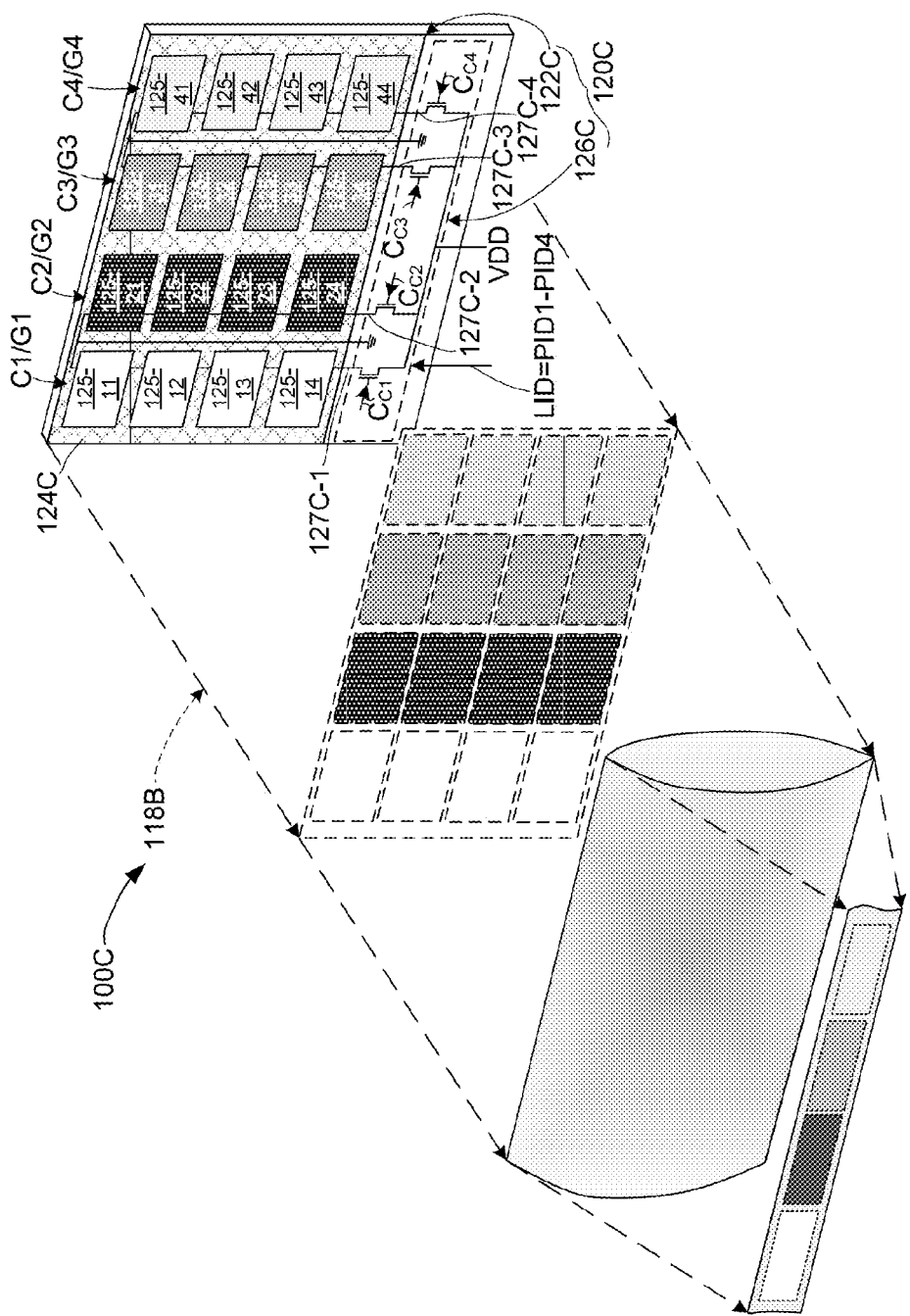

According to specific embodiments described with reference to FIGS. 2, 3(A) and 3(B), various alternative two-dimensional light field generators include light emitting elements that are either addressed independently or using common drive currents. Specifically, FIG. 2 depicts a light field generator 120A in which device controller 126A generates individual control signals for each light emitting element. As described below, addressing the light emitting elements independently involves generating and transmitting a separate control signal for each light emitting element, which facilitates beam shaping but requires a large number of control lines and associated expense. FIGS. 3(A) and 3(B) respectively depict light field generator 120B and 120C in which all the light emitting elements in each column (group) are controlled by a single (common) drive current (or voltage). The use of shared (common) drive currents for each column saves much expense and complexity, and gray scale control can still be achieved by controlling the amount of current transmitted to a given column in an analog manner.

Referring to FIG. 2, imaging system 100A includes two-dimensional light field generator 120A having an array 122A of light emitting elements 124-11 to 125-34, and a control unit 126A, where control circuit 126A includes an array of control (memory) cells 128-11 to 128-34 that store one scan line image data portion (e.g., scan line image data portion LIN1) during each imaging phase of an imaging operation. For example, at a given time, scan line image data portion LIN1 is transmitted (written) from a system controller (not shown) to device controller 126A using known techniques. In this example, device controller 126A interprets each associated pixel data value PID1 to PID3, and generates corresponding bit values that are then written into control (memory) cells 128-11 to 128-34. For example, pixel data value PID1 is interpreted as a full intensity pixel value, so device controller 126A writes logic "1" bit values into control cells 128-11 to 128-14. Similarly, pixel data value PID2 is interpreted as a minimum intensity pixel value and PID3 as a medium intensity pixel value, so device controller 126A writes logic "0" bit values into control cells 128-21 to 128-24, 128-31 and 128-34, and logic "1" bit values into memory cells 128-32 and 128-33. As described below, each light emitting element 125-11 to 125-34 is respectively individually controllable by way of the data bit stored in associated memory cells 128-11 to 128-34 (e.g., by way of control signals 127A) to switch between a fully-on (first) modulated state and a fully-off (second) modulated state. By selectively individually controlling light emitting elements 125-11 to 125-34 in accordance with image data ID in this manner, modulated light generator 120A is enabled to generates modulated light field 119B in accordance with supplied image data.

Figure 2A:
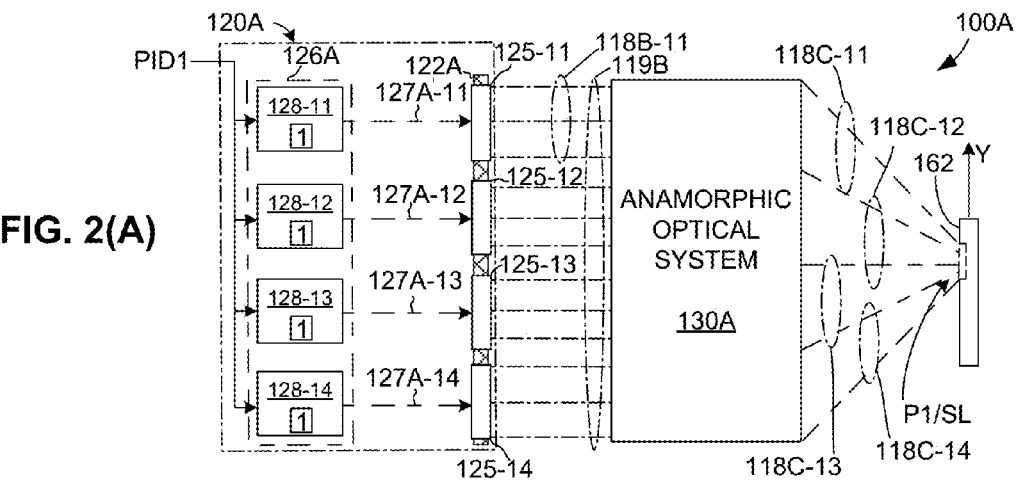
FIGS. 2(A), 2(B) and 2(C) are simplified side views showing the imaging system of FIG. 2 during an imaging operation according to an embodiment of the present invention.
Figure 2B:
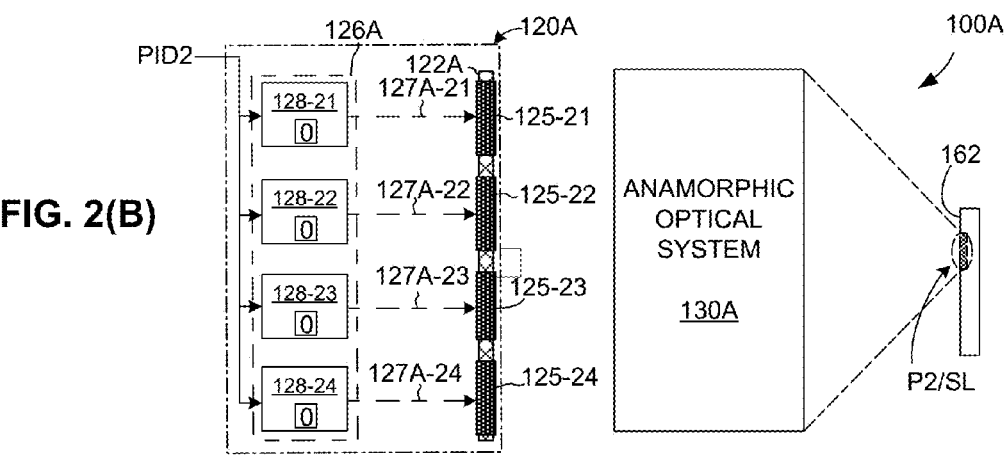
Figure 2C:
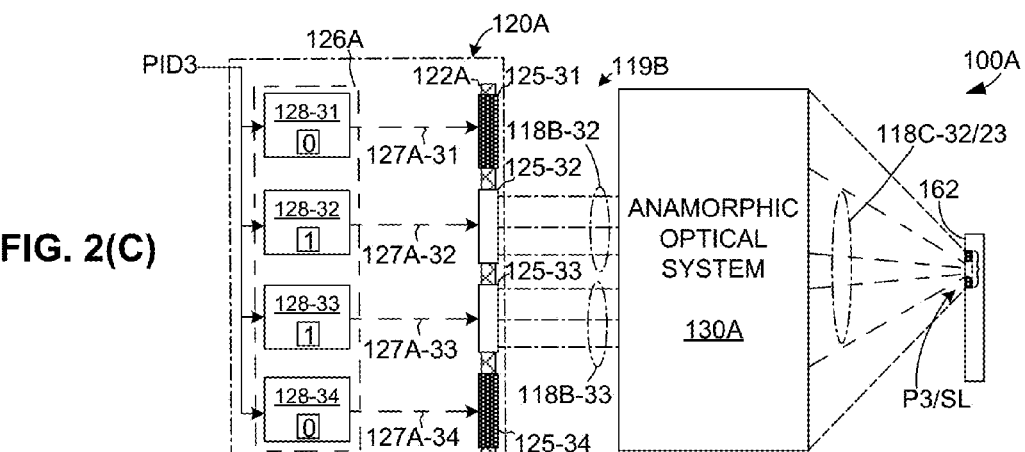

FIGS. 2(A) to 2(C) are simplified side views showing single columns of light emitting elements of imaging system 100A (FIG. 2) after the bit values mentioned above have been written into memory cells 128-11 to 128-34 of control circuit 126A, and illustrate how each column (group) of light emitting elements is individually controlled to generate modulated light field 119B of FIG. 2. FIG. 2(A) shows column C1 (group G1) of FIG. 2, and in particular shows that memory cells 128-11 to 128-14 respectively transmit control signals 127A-11 to 127A-14, which have values set in accordance to the stored logic "1" data values, which causes each of light emitting elements 125-11 to 125-14 to turn on (e.g., causing light emitting element 125-11 to emit light 118B-11) that is then anamorphically concentrated by anamorphic optical system 130A such that concentrated light portions 118C-11 to 118C-14 generate pixel P1 in region SL1 on imaging surface 162. FIG. 2(B) shows column C2 (group G2) of FIG. 2, and in particular shows that memory cells 128-21 to 128-24 respectively transmit control signals 127A-21 to 127A-24, which have values set in accordance to the stored logic "0" data values, which causes light emitting elements 125-21 to 125-24 to turn off, whereby no light is passed through anamorphic optical system 130A and pixel P2 in region SL2 on imaging surface 162 remains dark. FIG. 2(C) shows column C3 (group G3) of FIG. 2, where memory cells 128-31 and 128-34 generate control signals 127A-31 and 127A-34 that cause light emitting elements 125-31 and 125-34 to turn off, and where memory cells 128-32 and 128-33 respectively transmit control signals 127A-32 and 127A-33 that cause light emitting elements 125-32 and 125-33 to turn on, thereby producing modulated light portions 118B-32 and 118B-33 that are then anamorphically concentrated by anamorphic optical system 130A such that concentrated light portions 118C-32 and 118C-33 generate pixel P3 in region SL3 on imaging surface 162.

FIGS. 3(A) and 3(B) show imaging systems 100B and 100C, respectively, in which each includes a two-dimensional light field generator having an array of light emitting elements 124-11 to 125-44, and each includes an associated control unit configured to generate shared drive currents according to associated pixel image data values PID1 to PID4 of line image data LID, where all light emitting elements in each said column C1 to C4 forming associated pixel groups G1 to G4 receive one of the shared drive currents. A common drive of all emitters in a given column saves much expense and complexity in driving the emitters, and gray scale control can still be achieved by controlling the current amount transmitted to a given column in an analog manner. For example, referring to FIG. 3(A), light field generator 120B includes array 122B and control unit 126B, where control unit 126B is configured to generate drive currents 127B-1 to 127B-4 according to associated pixel image data value PID1 to PID4, respectively, and where array 122B is coupled to controller 126B such that elements 125-11 to 125-14 of column C1 (i.e., group G1) receive drive current 127B-1, elements 125-21 to 125-24 in column C2 (i.e., group G2) receive drive current 127B-2, elements 125-31 to 125-34 in column C3 (i.e., group G3) receive drive current 127B-3, and elements 125-41 to 125-44 in column C4 (i.e., group G4) receive drive current 127B-4. In the embodiment depicted in FIG. 3(A), gray scale control is achieved by controlling the amount of current transmitted to a given column in an analog manner. For example, controller 126B is further configured to vary an analog value of each drive current 127B-1 to 127B-4 according to said associated pixel image data values PID1 to PID4, by way of generating corresponding analog control values $C_{B1}$ to $C_{B4}$, which are used to control the current applied to each pixel column (e.g., by way of current control circuitry depicted by transistors), such that a maximum current is delivered to group G1, zero current is delivered to group G2, and two different intermediate currents are delivered to groups G3 and G4, which is depicted by way of different shading of corresponding modulated light portions 118B-11 to 118B-44 in modulated light field 119B and different shaded image pixels P1 to P4 forming scan line SL. FIG. 3(B) shows a second light field generator 120C including control unit 126C that is similarly configured to generate drive currents 127C-1 to 127B-4 according to associated pixel image data value PID1 to PID4, respectively, by way of analog control values $C_{C1}$ to $C_{C4}$, where elements 125-11 to 125-14 of array 122C receive drive current 127C-1, elements 125-21 to 125-24 receive drive current 127C-2, elements 125-31 to 125-34 receive drive current 127C-3, and elements 125-41 to 125-44 receive drive current 127C-4. The embodiments depicted in FIGS. 3(A) and 3(B) differ in that light field generator 120B is configured to deliver drive currents 127B-1 to 127B-4 (FIG. 3(A)) to their associated pixel groups in parallel, whereas light field generator 120C is configured to deliver drive currents 127C-1 to 127C-4 (FIG. 3(B)) in series. The series arrangement of light field generator 120C requires more process steps, but allows a higher voltage, lower current drive source to be used.

Figure 4A:
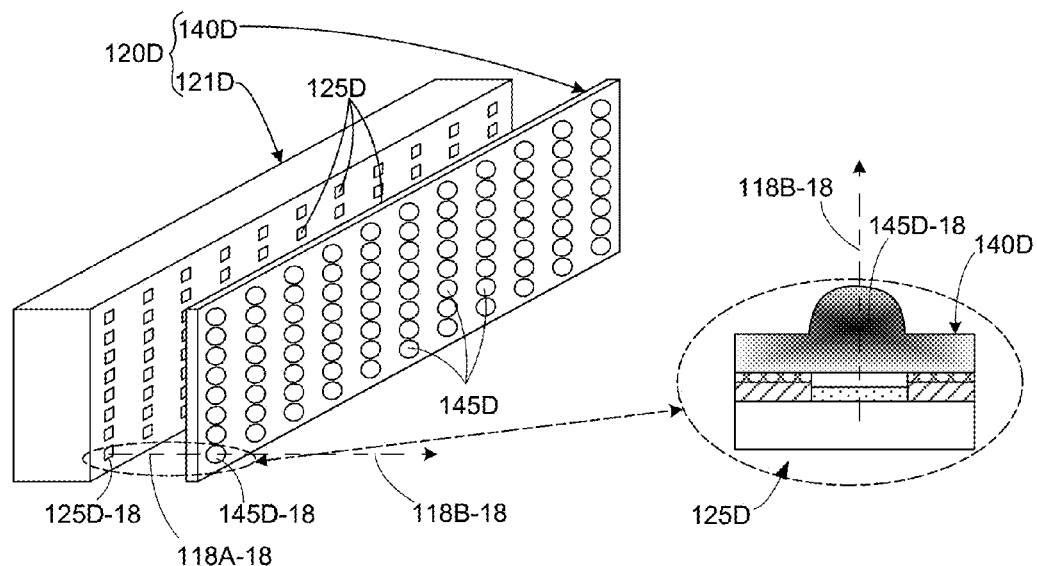
FIGS. 4(A) and 4(B) are simplified top and side views, respectively, showing microlens arrangements utilized by the imaging system of FIG. 1 according to alternative specific embodiments of the present invention.
Figure 4B:
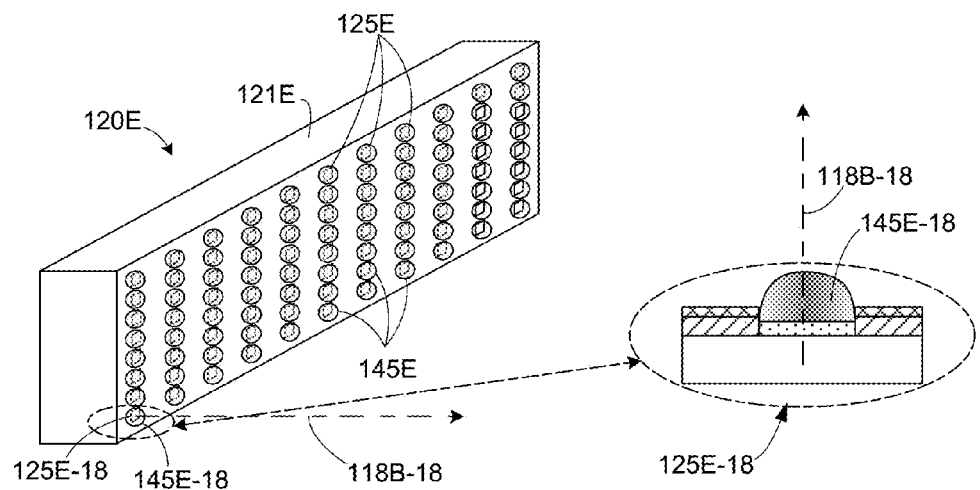

FIGS. 4(A) and 4(B) are simplified figures depicting light field generators according to alternative embodiments in which improved optical throughput and collimation are achieved by disposing microlenses in front of each light emitting element. FIG. 4(A) shows light field generator 120D including a (first) substrate 121D on which light emitting elements 125D are formed, and a (second) substrate 140D including an array of microlenses 145D, where substrate 140D is disposed in a hybrid fashion on substrate 121D during production such that, as indicated in the bubble at the right of FIG. 4(A), light portions generated/transmitted by each light emitting element (e.g., light portion 118B-18 generated by element 125D-18) passes through an associated microlens (e.g., microlens 145D-18). Alternatively, FIG. 4(B) shows light field generator 120E in which VCSEL elements 125E are disposed on a substrate 121E, and microlenses 145E are integrally disposed on substrate 121E such that associated light portions (e.g., light portion 118E-18) transmitted by each light emitting element (e.g., element 125E-18) passes through an associated microlens (e.g., microlens 145E-18). In either case depicted in FIGS. 4(A) and 4(B), the use of microlenses was found to greatly improve optical throughput (i.e., throughput ratio at the imaging plane was measured to improve from 0.55 to 0.79).

Figure 5A:
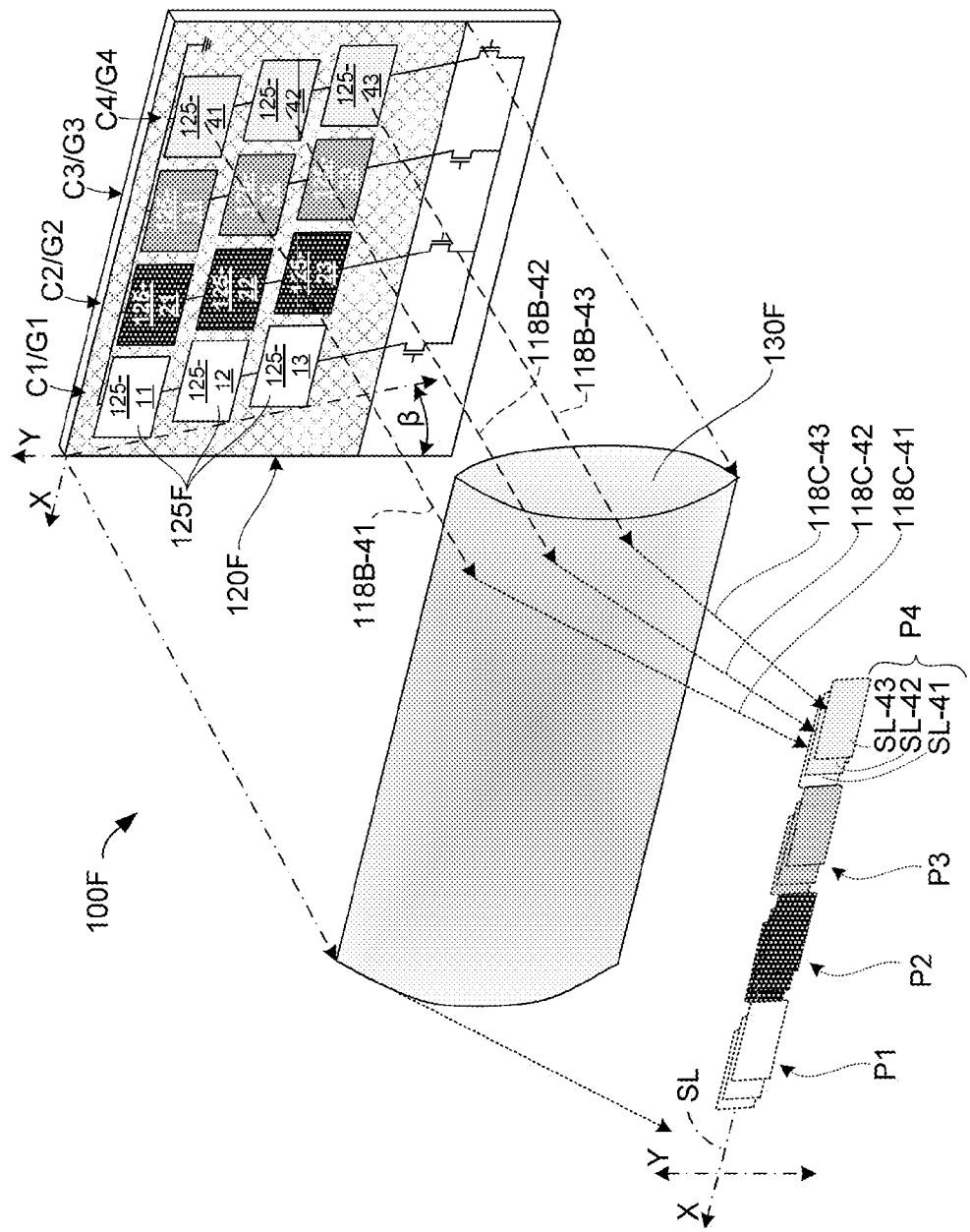
FIGS. 5(A) and 5(B) are VCSEL-type light field generators having various shaped light emitting elements and arranged in parallelogram arrangement according to a another embodiment of the present invention.
Figure 5B:
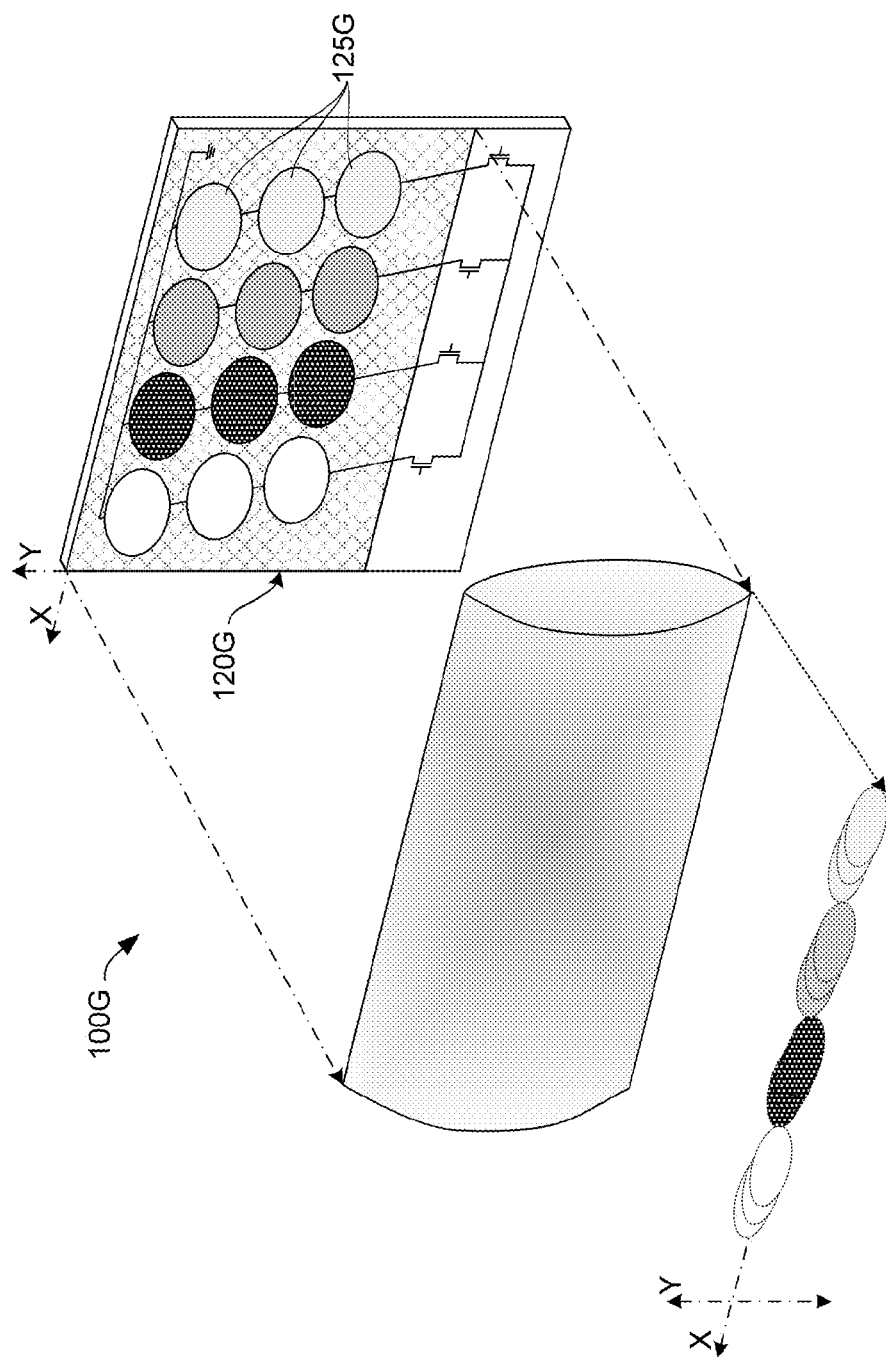

FIGS. 5(A) and 5(B) respectively show light field generators 120F and 120G according alternative embodiments in which the light emitting elements in each column (i.e., each pixel group) are disposed in a parallelogram configuration. For example, FIG. 5(A) shows light field generator 120F in which light emitting elements 125-11 to 125-43 are disposed in a parallelograph arrangement such that light emitting elements in each column/group (e.g., elements 125-11 to 125-13 in column C1/group G1) are aligned at a diagonal angle β relative to the process (Y-axis) direction. With this arrangement, the concentrated modulated light portions are directed onto associated sub-imaging regions of elongated scan line image SL, where the sub-imaging regions are slightly offset in the cross-process (X-axis) direction. For example, elements 125-41 to 125-43 in column C4/group G4 emit modulated light portions 118B-41 to 118B-43 that are imaged and concentrated by anamorphic optical system 130F in the manner described herein such that concentrated light portions 118C-41 to 118C-43 are directed onto pixel form scan line image SL. Because elements 125-41 to 125-43 are aligned along diagonal angle β, modulated light portions 118B-41 to 118B-43 are slightly offset in the cross-process direction, whereby concentrated light portions 118B-41 to 118B-43 are directed onto associated sub-imaging regions SL-41 to SL-43 of pixel image region P4, which are slightly offset from each other in the process (Y-axis) and cross-process (X-axis) directions. By aligning light emitting element groups along diagonal angle β, the present invention facilitates the formation of an imaging system that provides both the higher sub-pixel spacing associated with the parallelogram arrangement and the superior pixel image generation provided by the multi-level image exposure methods (i.e., by way of utilizing software to position image "pixels" with fractional precision in both the X-axis and Y-axis directions). That is, the use of parallelogram configurations similar to those illustrated in FIGS. 5(A) and 5(B) allows the summed emissions from a given column to fill the associated imaged pixel region of scan line image SL. If the image of a single emitter is smaller than the pixel pitch, then intensity modulation would occur along a nominally fully intense line (all pixels ON). By adding together slightly offset emissions, the full imaged pixel can be filled.

According to another aspect of the alternative exemplary embodiments illustrated in FIGS. 5(A) and 5(B), improved beam divergence characteristics in the process and cross-process directions may be achieved by tailoring the shape of the light emitting elements to optimize light collection into image pixels without loss of resolution. For example, light emitting elements 125F of light field generator 120F (FIG. 5(A)) have a rectangular shape, which generates a particular beam divergence. As indicated by light field generator 120G in FIG. 5(B), in some instances improved beam divergence characteristics in the process and cross-process directions may be achieved by forming light emitting elements 125G with a round or oval shape.

Figure 6A:
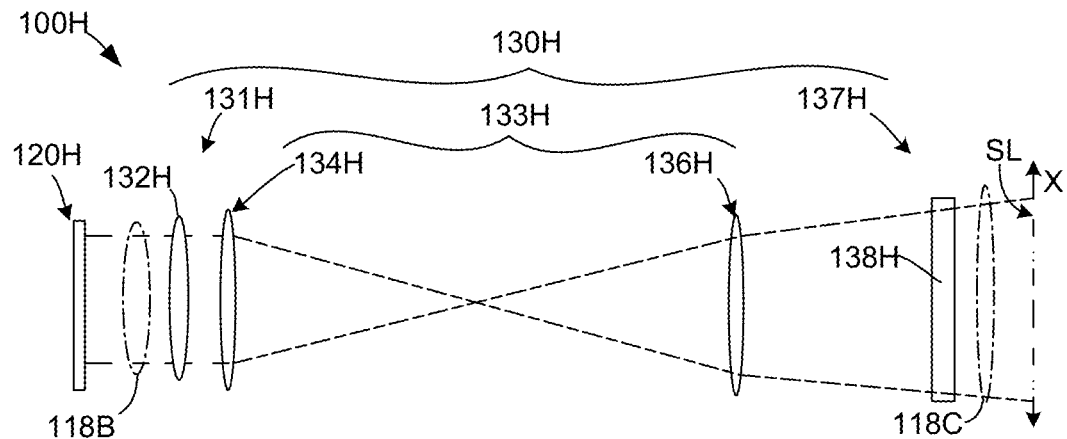
FIGS. 6(A) and 6(B) are top and side views, respectively, showing a simplified multi-lens anamorphic optical system arrangements utilized by the imaging system of FIG. 1 according to alternative specific embodiments of the present invention.
Figure 6B:
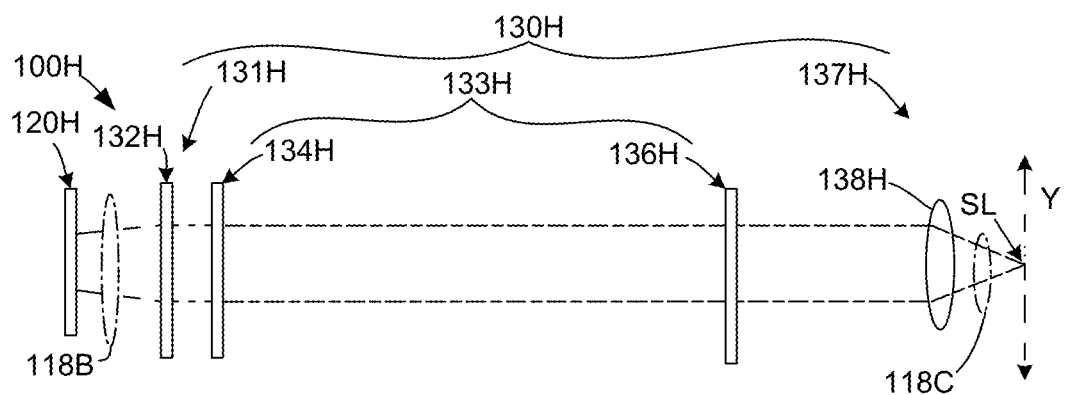

FIGS. 6(A) and 6(B) are simplified diagrams showing a portion of an imaging system 100H including a generalized anamorphic optical system 130H according to an exemplary embodiment of the present invention. Referring to FIG. 6(A), anamorphic optical system 130H includes an optional collimating optical subsystem 131H, a cross-process optical subsystem 133H, and process-direction optical subsystem 137H according to an exemplary specific embodiment of the present invention. As indicated by the ray traces in FIGS. 6(A) and 6(B), optical subsystems 131H, 133H and 137H are disposed in the optical path between light field generator 120H and scan line SL, which is generated at the output of imaging system 100H. FIG. 6(A) is a top view indicating that collimating optical subsystem 131H and cross-process optical subsystem 133H act on the modulated light portions 118B passed by light field generator 120H to form concentrated light portions 118C on scan line SL parallel to the X-axis (i.e., in the cross-process direction), and FIG. 6(B) is a side view that indicates how collimating optical subsystem 131H and process-direction optical subsystem 137H act on modulated light portions 118B and generate concentrated light portions 118C on scan line SL in a direction perpendicular to the Y-axis (i.e., in the process direction). Optional collimating optical subsystem 131H includes a collimating field lens 132H formed in accordance with known techniques that is located immediately after spatial light modulator 120H, and arranged to collimate the light portions that are slightly diverging off of the surface of the spatial light modulator 120H. Cross-process optical subsystem 133H is a two-lens cylindrical or acylindrical projection system that magnifies light in the cross-process (scan) direction (i.e., along the X-axis), and process-direction optical subsystem 137H is a cylindrical or acylindrical single focusing lens subsystem that focuses light in the process (cross-scan) direction (i.e., along the Y-axis). The advantage of this arrangement is that it allows the intensity of the light (e.g., laser) power to be concentrated on scan line SL located at the output of single-pass imaging system 100H. Two-lens cylindrical or acylindrical projection system 133H includes a first cylindrical or acylindrical lens 134H and a second cylindrical or acylindrical lens 136H that are arranged to project and magnify modulated light portions (imaging data) 118B passed by light field generator 120H (and optional collimating optical subsystem 131H) onto an imaging surface (e.g., a cylinder) in the cross process direction. Lens subsystem 137H includes a third cylindrical or acylindrical lens 138H that concentrates the projected imaging data down to a narrow high resolution line image on scan line SL. As the focusing power of lens 138H is increased, the intensity of the light on spatial light modulator 120H is reduced relative to the intensity of the line image generated at scan line SL. However, this means that cylindrical or acylindrical lens 138H must be placed closer to the process surface (e.g., an imaging drum) with a clear aperture extending to the very edges of lens 138H.

According to a presently preferred embodiment, anamorphic optical system 130H is formed with an optical magnification in the process direction that is less than one (demagnification), depending upon the desired line width, and optical magnification in the cross-process direction chosen to provide the desired line length. In a practical embodiment, anamorphic projection optical system 130H is produced with a magnification of −1.96 in the cross-process direction and −0.14 in the process direction. Multi-mode VCSELs will require a higher numerical aperture projection optical system for a given resolution. This may limit the optical resolution or amount of demagnification in the process direction. The image quality may also be poorer but could be acceptable depending upon the particular application.

Figure 7:
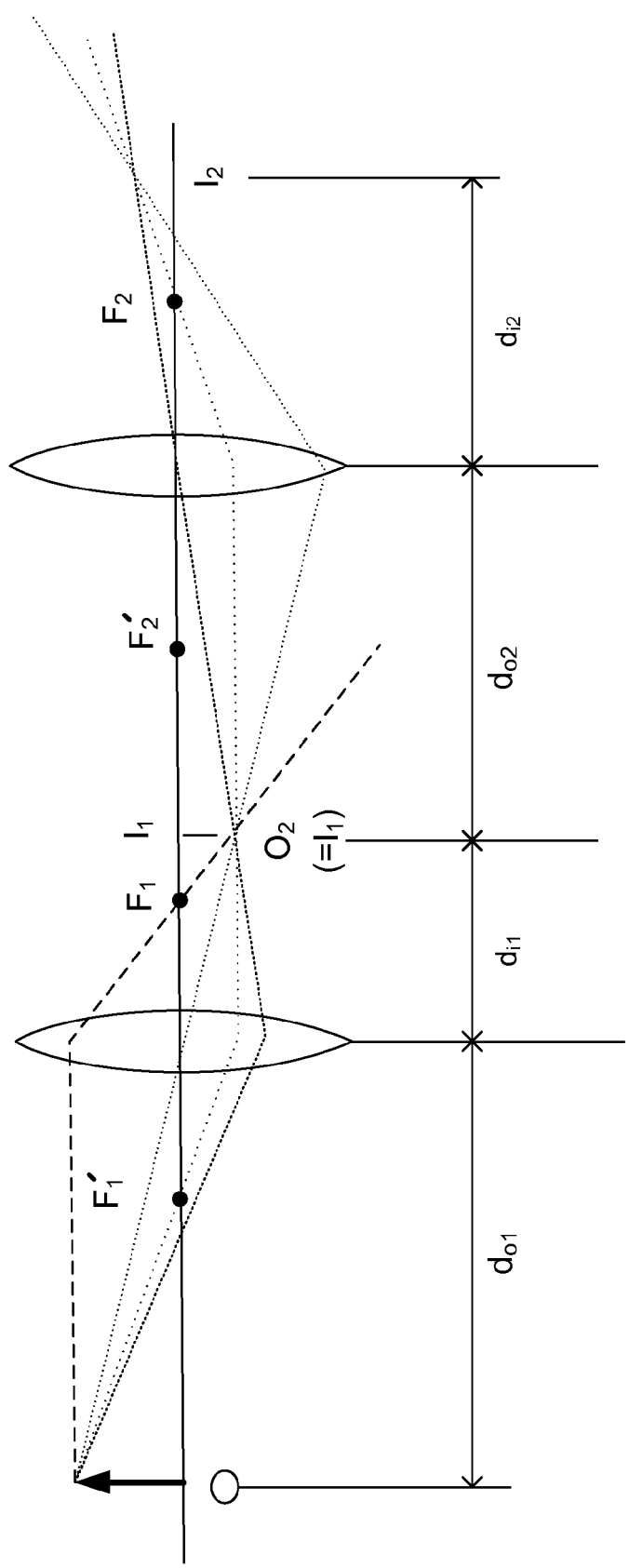
FIG. 7 is a simplified diagram showing the demagnifying characteristics of the anamorphic optical system of FIGS. 6(A) and 6(B)

FIG. 7 illustrates the concept of using demagnifying optics to combine the aggregate light output of a VCSEL array onto a concentrated spot. In this way, the enhanced optical power provided by multiple VCSELs can be delivered to a small pixel. Multiple pixels can then be arranged in a line, with each pixel addressed by turning its corresponding set of VCSEL elements on or off. The example of FIG. 7 demonstrates the concept using a two-lens spherical optical system consisting of an F1=20 mm lens and an F2=3 mm lens separated by 15 mm. By placing a VCSEL array at d01=3 mm away from the first lens, a 5× demagnification is achieved at the image plane di2. In an example using a 217 μm×108 μm 32-element VCSEL array, experiments using the optical system described in FIG. 5 generated an image demagnified by 5× to a 42 μm×21 μm pixel, appropriate for a 600 dpi line generator. Although this demonstration system imaged a 2-dimensional VCSEL array to form a pixel, the same concept applies in the actual situation of forming pixels with cylindrical anamorphic optics which can be demagnifying in the column direction and magnifying in the row direction.

Figure 8:
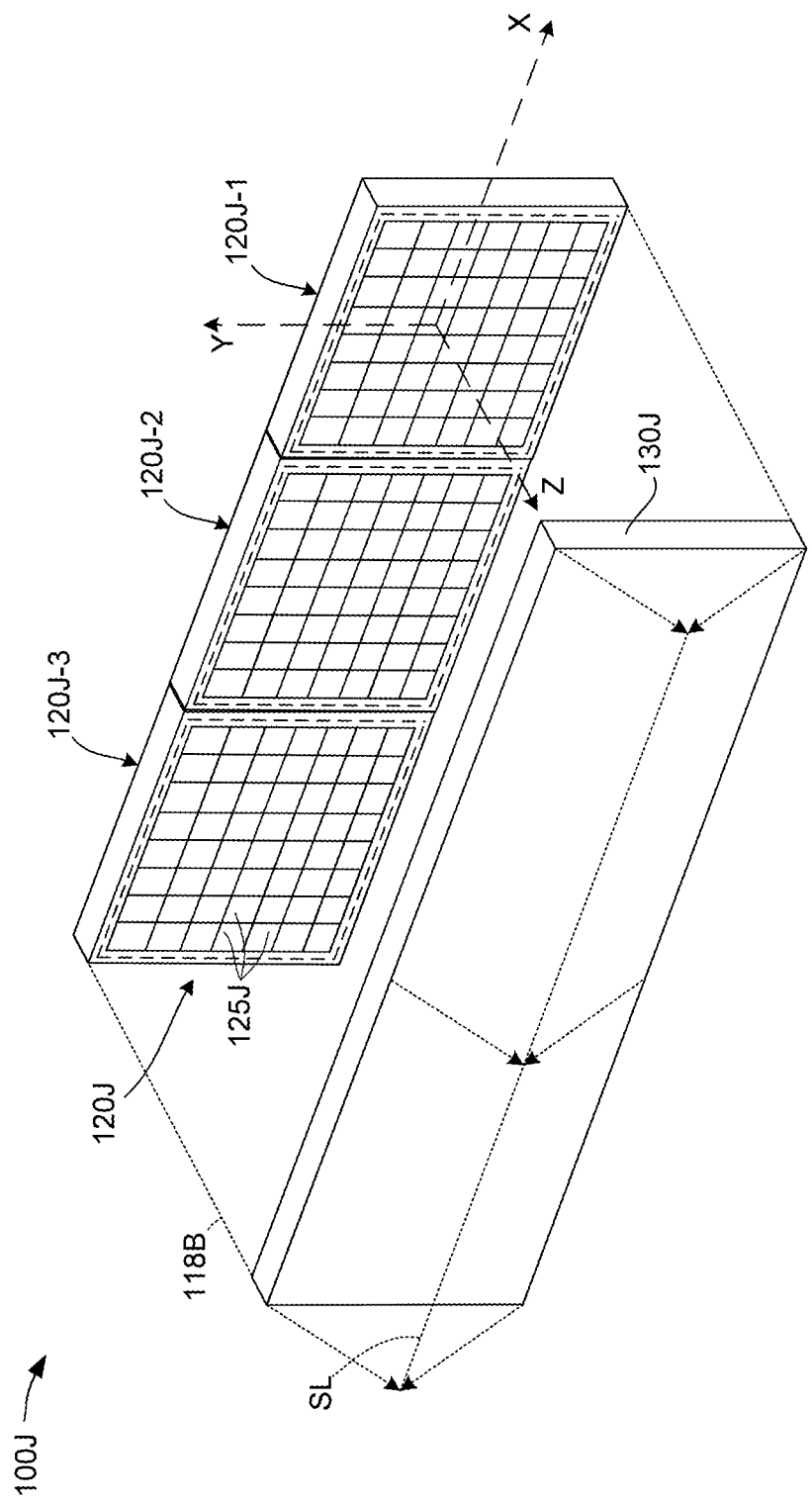
FIG. 8 is a simplified perspective view showing a imaging system utilizing multiple VCSEL-type light field generators according to another embodiment of the present invention.

According to various practical embodiments, imaging systems generated in accordance with the present invention include two-dimensional light field generators comprising multiple VCSEL devices disposed in an n×m array, where n and m are integers and at least one of n and m is greater than 1. FIG. 8 depicts an imaging system 100J in which a two-dimensional light field generator 120J includes three VCSEL devices 120J-1 to 120J-3 disposed in a 1×3 array, with VCSEL devices 120J-1, 120J-2 and 120J-3 aligned in the cross-process (X-axis) direction. By operating VCSEL devices in the manner described above (i.e., by imaging and condensing modulated light 118B generated by light emitting elements 125J in each column to generate a line of pixel images) and by providing a suitably wide anamorphic optical system, this arrangement facilitates generating a longer scan line image SL than could be achieved using a single VCSEL device, and the length of scan line SL can be easily lengthened by increasing the number of aligned VCSEL devices (and making appropriate modifications to the optical system). The basic notion is to form long chains of VCSEL devices and to map the collimated outputs of columns of emitters onto single pixels in an image plane, thereby facilitating various apparatus/systems such as the scanning/printing apparatus described below.

Figure 9:
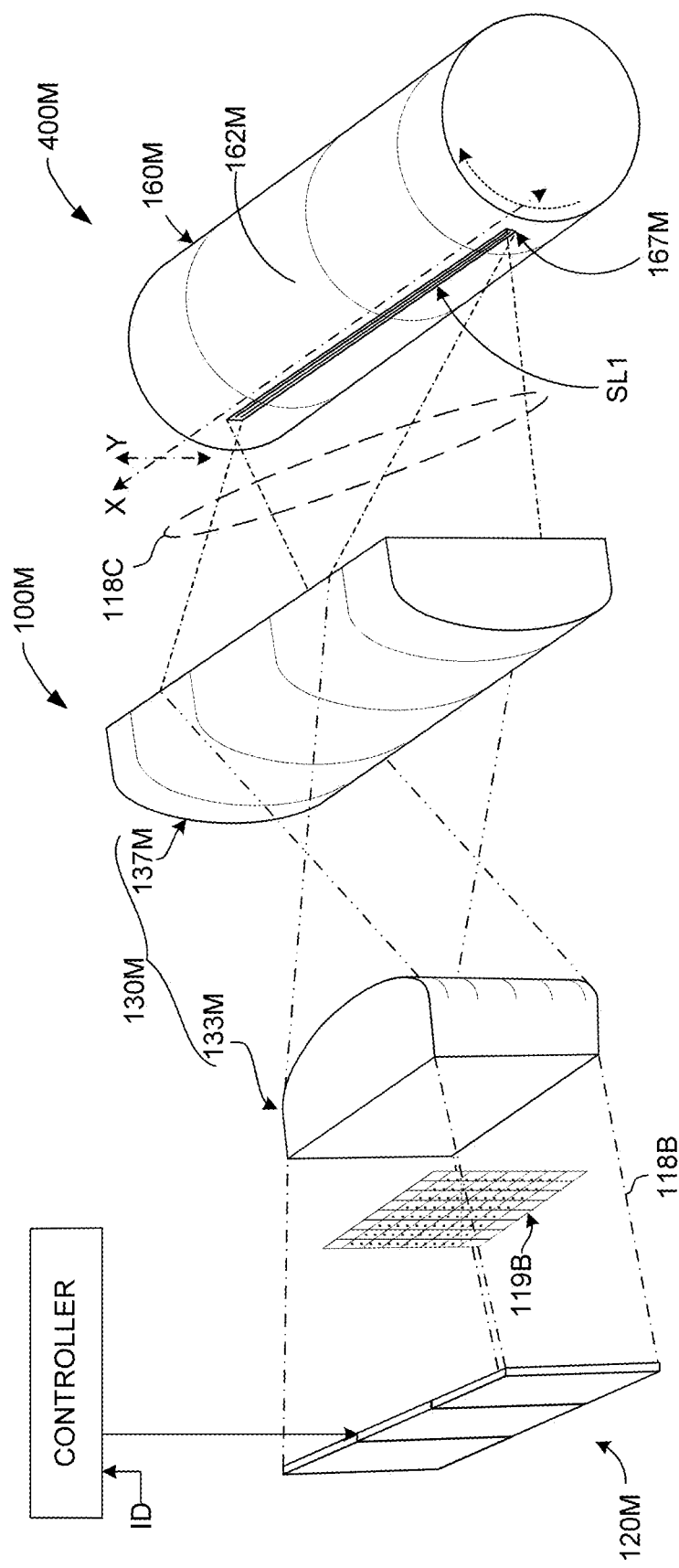
FIG. 9 is a perspective view showing a printing system including an imaging system utilizing the VCSEL-type light field generator in the folded arrangement according to another specific embodiment of the present invention.

FIG. 9 is a perspective view showing a scanning/printing apparatus 400M including a single-pass imaging system 100M having a two-dimensional light field generator 120M including a single row of VCSEL devices configured as described above with reference to FIG. 8, and an associated elongated anamorphic optical system 130M arranged to generate an elongated scan line according to another specific embodiment of the present invention. Imaging system 100M also includes a controller that transmits scan line image data portions (e.g., portion LIN11) to each VCSEL device of light field generator 120M. Similar to the embodiment of FIG. 8, light field generator 120M produces a modulated light field 119B that is imaged and concentrated by a cross-process optical subsystem 133M and a process-direction optical subsystem 137M of an anamorphic optical system 130M onto an outer (imaging) surface 162M, which in this case is implemented by a drum cylinder 160M. In this embodiment, anamorphic optical system 130M inverts modulated light field 119B in both the process and cross-process directions such that the position and left-to-right order of the two scan line images generated on drum cylinder 160M are effectively "flipped" in both the process and cross-process directions. Consistent with the aspects described above, multi-level image exposure is achieved using imaging system 100M by configuring groups of light emitting elements of the VCSEL devices forming light field generator 120M that are substantially aligned in the process (Y-axis) direction such that grayscale pixel images are implemented either by activating contiguous light emitting elements that are disposed in the central region of the associated MEMS mirror mechanism group, or utilizing analog drive currents in the manner described above.

FIGS. 10(A) to 10(D) are simplified side views showing scanning/printing apparatus 400M of FIG. 9 during an exemplary imaging operation. Note that the simplified side views ignore inversion in the process-direction, and as such anamorphic optical system 130M is depicted by a single cross-process lens.

FIG. 10(A) illustrates imaging system 100M(T1) (i.e., imaging system 100M during a first time period T1 of the imaging operation) when exemplary modulating element group G2 of spatial light modulator 120M is respectively configured in accordance with scan line image data group PID12 in the manner described above with reference to FIG. 9. In particular, FIG. 10(A) depicts the configuration of light emitting elements 125M-21 to 125M-28 using pixel image data portion PID12 such that elements 125M-22 to 125M-27 are activated (fully on) and elements 125M-21 and 125M-28 are deactivated (fully off).

Figure 10C:
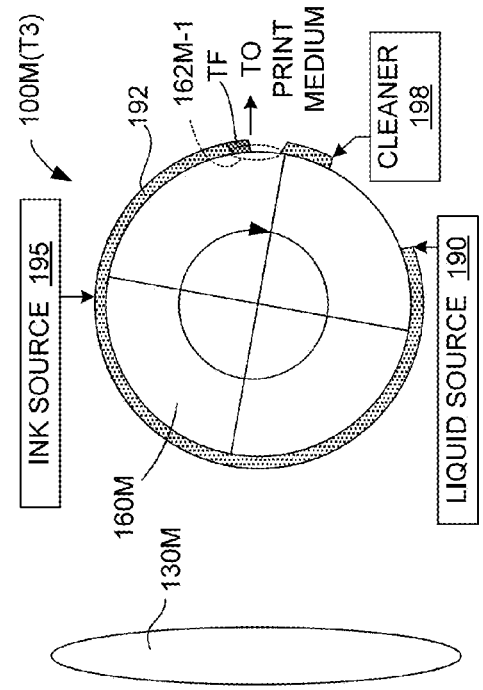
Figure 10C:
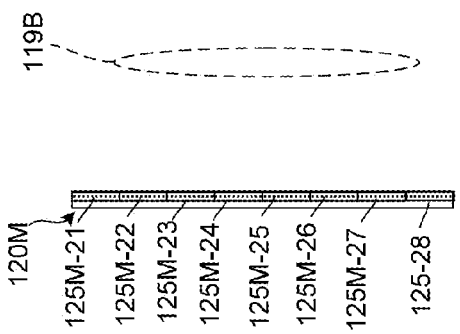

Referring to the right side of FIG. 10(A), to implement an image transfer operation, imaging system 100M further includes a liquid source 190 that applies a fountain solution 192 onto imaging surface 162M at a point upstream of the imaging region, an ink source 195 that applies an ink material 197 at a point downstream of imaging region. In addition, a transfer mechanism (not shown) is provided for transferring the ink material 197 to a target print medium, and a cleaning mechanism 198 is provided for preparing imaging surface 162M for the next exposure cycle. The image transfer operation is further described below with reference to FIGS. 10(B) to 10(D).

Referring again to FIG. 10(A), because of their modulated (on/off) state, light emitting elements 125M-22 to 125M-27 generate modulated light portions 118B-21 to 118B-27 that form modulated light field 119B, which is directed through anamorphic optical system 130M. Anamorphic optical system 130M images and concentrates modulated light field 119B, thereby generating concentrated modulated light field 119C that produces pixel image P12, which forms part of a scan line image SL1 in an elongated surface region 162M-1 on imaging surface 162M. In particular, the concentrated light associated formed by modulated light portions 118B-21 to 118B-27 removes (evaporates) fountain solution 192 from the elongated surface region 162M-1 (i.e., such that surface region 162M-1 at pixel image P21 is exposed). Note that the size of pixel image P21 (i.e., the amount of fountain solution that is removed from imaging surface 162M) is determined by number of activated light emitting elements.

Figure 10D:
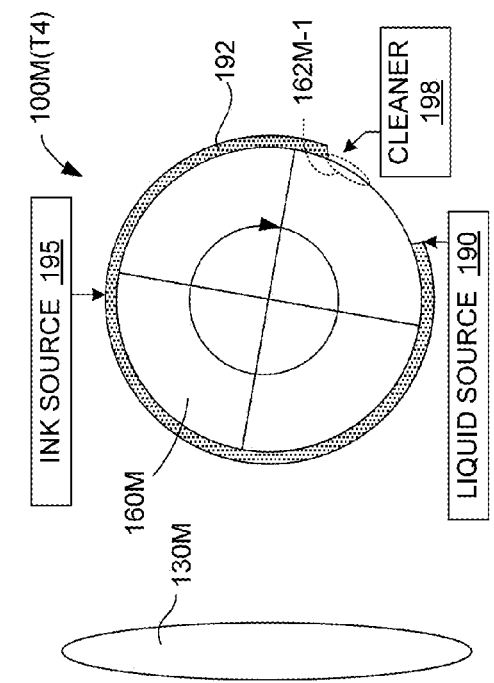
Figure 10D:
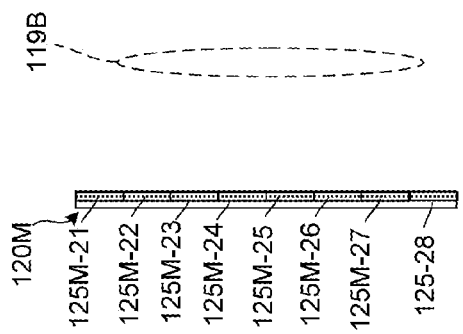

FIGS. 10(B), 10(C) and 10(D) show imaging system 100M at times subsequent to time T1, where spatial light modulator 120M is deactivated in order to how surface feature P12 (see FIG. 10(A)) is subsequently utilized in accordance with the image transfer operation of imaging system 100M. Referring to FIG. 10(B), at a time T2 drum cylinder 160M has rotated such that surface region 162M-1 has passed under ink source 195. Due to the removal of fountain solution depicted in FIG. 10(A), ink material 197 adheres to exposed surface region 162M-1 to form an ink feature TF. Referring to FIG. 10(C), at a time T3 while ink feature TF is passing the transfer point, the weak adhesion between the ink material and surface region 162M-1 and the strong attraction of the ink material to the print medium (not shown) causes ink feature TF to transfer to the print medium, resulting in a "dot" in the ink printed on the print medium. At a subsequent T4, as indicated in FIG. 10(D), surface region 162M-1 is rotated under cleaning mechanism 198, which removes any residual ink and fountain solution material to prepare surface region 162M-1 for a subsequent exposure/print cycle. According to the above-described image transfer operation, ink material only transfers onto portions of imaging surface 162M that are exposed by the imaging process described above (i.e., ink material does not adhere to fountain solution 192), whereby ink material is only transferred to the print medium from portions of drum roller 160H that are subjected to concentrated light as described herein. Thus, variable data from fountain solution removal is transferred, instead of constant data from a plate as in conventional systems. For this process to work using a rastered light source (i.e., a light source that is rastered back and forth across the scan line), a single very high power light (e.g., laser) source would be required to sufficiently remove the fountain solution in real time. A benefit of the imaging operation of the present invention is that, because liquid is removed from the entire scan line simultaneously, an offset press configuration is provided at high speed using multiple relatively low power light sources.

Figure 11:
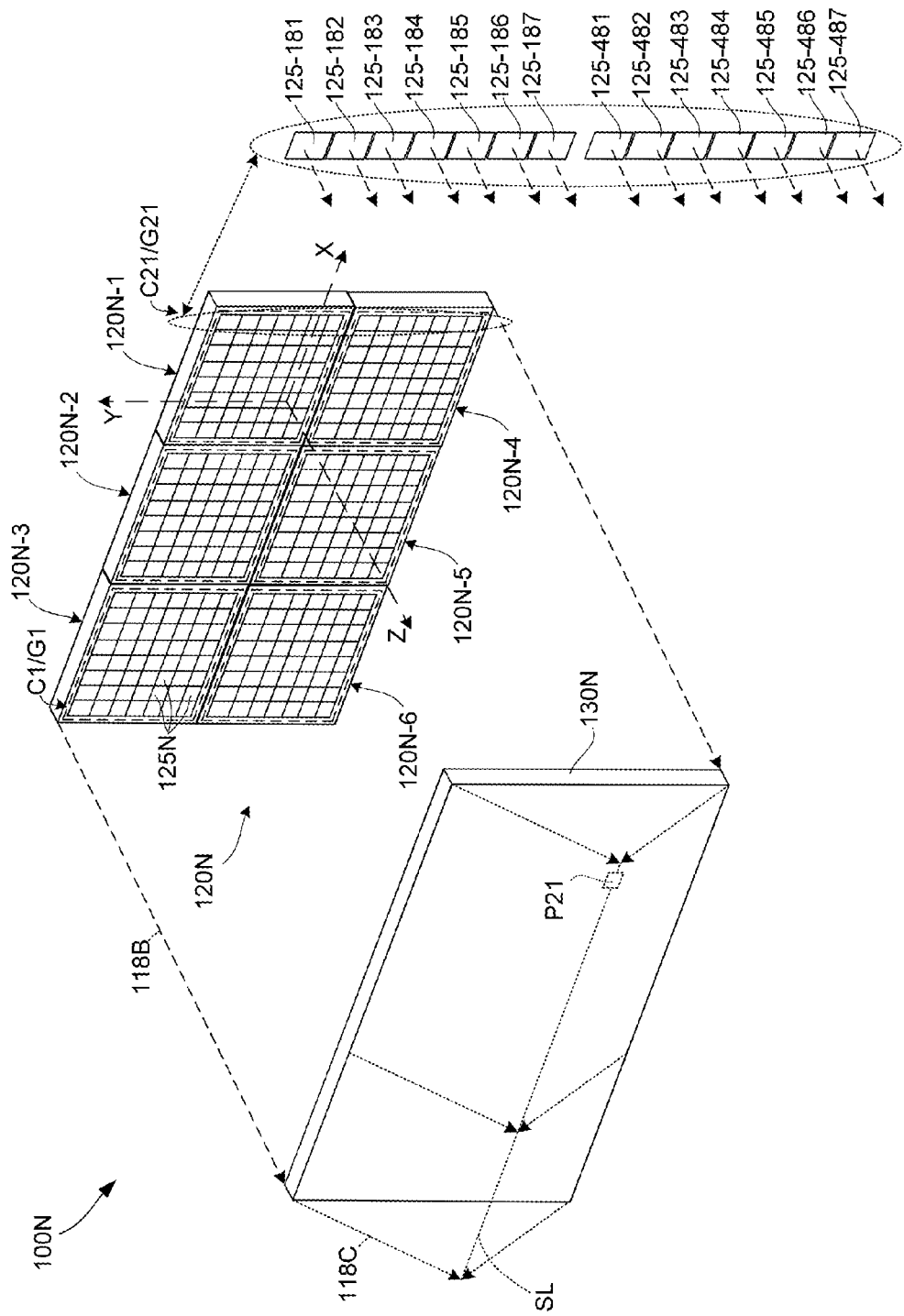
FIG. 11 is a perspective view showing a high energy imaging system including multiple VCSEL devices arranged in an array according to another embodiment of the present invention.

FIG. 11 depicts an imaging system 100N according to another exemplary embodiment in which a two-dimensional light field generator 120N includes six VCSEL devices 120N-1 to 120N-6 disposed in a 2×3 array, with VCSEL devices 120N-1, 120N-2 and 120N-3 forming an upper row and VCSEL devices 120N-4, 120N-5 and 120N-6 forming a lower row. In this arrangement, two or more VCSEL devices are aligned in the process (Y-axis) direction such that each column (i.e., each associated pixel group) includes an aligned set of light emitting elements that are disposed on two or more VCSEL devices). For example, as indicated in the bubble on the right side of FIG. 11, column C21 of light field generator 120N comprises pixel group G21 including light emitting elements 125-181 to 125-187 of VCSEL device 120N-1 and light emitting elements 125-481 to 125-487 of VCSEL device 120N-4. As indicated at the left side of FIG. 11, because anamorphic optical system 130N images and concentrates all light from pixel group G21 onto a single image pixel region P21, this arrangement illustrates how the present invention may be utilized to facilitate generating very high energy laser lines that may be useful in a wide range of industrial applications.

Although the present invention has been described with respect to certain specific embodiments, it will be clear to those skilled in the art that the inventive features of the present invention are applicable to other embodiments as well, all of which are intended to fall within the scope of the present invention. For example, the methods described above for generating a high energy scan line image may be achieved using devices other than those described herein.

The invention claimed is:

1. A single-pass imaging system comprising:
  a two-dimensional light field generator including:
    a plurality of light emitting elements disposed in a two-dimensional array, each light emitting element being adjustable between two or more modulated states such that, when said each light emitting element is in a first modulated state said each light emitting element transmits an associated modulated light portion having a first intensity, and when said each light emitting element is in a second modulated state said each light emitting element transmits said associated light portion having a second intensity, said second intensity being lower than said first intensity, and wherein each light emitting element is arranged to direct said associated light portion in a corresponding predetermined direction, whereby said plurality of light emitting elements generate a modulated two-dimensional light field, and
    a controller configured to control the plurality of light emitting elements in accordance with received image data; and
  an anamorphic optical system positioned to receive said modulated two-dimensional light field from said two-dimensional light field generator, and arranged to concentrate said associated light portions transmitted from said each light emitting element such that the concentrated modulated light portions produce an elongated scan line image,
  wherein the plurality of light emitting elements are arranged in a plurality of rows and a plurality of columns, wherein all of said light emitting elements in each said column forms an associated pixel group,
  wherein the anamorphic optical system is arranged to concentrate modulated light portions received from each associated pixel group of said plurality of light emitting elements onto an associated said scan line portion of said elongated scan line image,
  wherein the anamorphic optical system includes a cross-process optical subsystem and a process-direction optical subsystem,
  wherein the cross-process optical subsystem includes first and second focusing lenses arranged to project and magnify said modulated light portions only in a cross-process direction,
  wherein the process-direction optical subsystem includes a third focusing lens arranged to concentrate said modulated light portions on said elongated scan line image parallel to a process direction, and
  wherein each of the first, second and third focusing lenses comprises one of a cylindrical lens and an acylindrical lens.

2. The imaging system according to claim 1, wherein the anamorphic optical system further comprises a collimating lens disposed between the two-dimensional light field generator and the plurality of focusing lens.

3. The imaging system according to claim 1, wherein said two-dimensional light field generator comprises a plurality of vertical-cavity surface-emitting laser (VCSEL) devices disposed in an array.

4. The imaging system according to claim 3, wherein each said associated pixel group comprises an aligned set of said light emitting elements that are disposed on two or more VCSEL devices.

5. A single-pass imaging system comprising:
  a two-dimensional light field generator including:
    a plurality of light emitting elements disposed in a two-dimensional array, each light emitting element being adjustable between two or more modulated states such that, when said each light emitting element is in a first modulated state said each light emitting element transmits an associated modulated light portion having a first intensity, and when said each light emitting element is in a second modulated state said each light emitting element transmits said associated light portion having a second intensity, said second intensity being lower than said first intensity, and wherein each light emitting element is arranged to direct said associated light portion in a corresponding predetermined direction, whereby said plurality of light emitting elements generate a modulated two-dimensional light field, and
    a controller configured to control the plurality of light emitting elements in accordance with received image data; and
  an anamorphic optical system positioned to receive said modulated two-dimensional light field from said two-dimensional light field generator, and arranged to concentrate said associated light portions transmitted from said each light emitting element such that the concentrated modulated light portions produce an elongated scan line image, wherein the anamorphic optical system includes a cross-process optical subsystem and a process-direction optical subsystem, wherein the cross-process optical subsystem includes first and second focusing lenses arranged to project and magnify said modulated light portions only in a cross-process direction, and wherein the process-direction optical subsystem includes a third focusing lens arranged to concentrate said modulated light portions on said elongated scan line image parallel to a process direction, and wherein each of the first, second and third focusing lenses comprises one of a cylindrical lens and an acylindrical lens.

6. The imaging system according to claim 5, wherein said two-dimensional light field generator comprises one of a multi-mode vertical-cavity surface-emitting laser (VCSEL) device and a single mode VCSEL device.

7. The imaging system according to claim 5, wherein said controller is configured to generate a plurality of drive currents, each drive current corresponding to an associated pixel image data value, wherein all of said light emitting elements in each said column forming an associated said pixel group receive an associated said shared drive current transmitted to said all of said light emitting elements from said controller.

8. The imaging system according to claim 5, wherein the anamorphic optical system further comprises a collimating lens disposed between the two-dimensional light field generator and the plurality of focusing lens.

* * * * *